US010035091B2

(12) United States Patent
Takahashi

(10) Patent No.: US 10,035,091 B2
(45) Date of Patent: Jul. 31, 2018

(54) LIQUID FUEL CATCHER

(71) Applicant: KYOSAN DENKI CO., LTD., Koga, Ibaraki-pref. (JP)

(72) Inventor: Tetsuya Takahashi, Shimotsuke (JP)

(73) Assignee: Kyosan Denki Co., Ltd., Koga, Ibaraki-pref. (JP)

( * ) Notice: Subject to any disclaimer, the term of this patent is extended or adjusted under 35 U.S.C. 154(b) by 189 days.

(21) Appl. No.: 14/842,957

(22) Filed: Sep. 2, 2015

(65) Prior Publication Data

US 2015/0377196 A1 Dec. 31, 2015

Related U.S. Application Data

(63) Continuation-in-part of application No. 14/643,364, filed on Mar. 10, 2015, now abandoned.

(30) Foreign Application Priority Data

Mar. 17, 2014 (JP) ................................ 2014-053818
Aug. 7, 2015 (JP) ................................ 2015-156534

(51) Int. Cl.
*F17D 1/00* (2006.01)
*B01D 45/16* (2006.01)
(Continued)

(52) U.S. Cl.
CPC ......... *B01D 45/16* (2013.01); *F02M 25/0872* (2013.01); *G05D 7/01* (2013.01);
(Continued)

(58) Field of Classification Search
CPC ............ B60K 15/03519; B60K 15/035; B60K 15/03504; B60K 2015/0344;
(Continued)

(56) References Cited

U.S. PATENT DOCUMENTS 1,794,989 A * 3/1931 Shoenberger ......... F16K 24/048
137/202
5,116,257 A * 5/1992 Szlaga ............. B60K 15/03519
137/43
(Continued)

FOREIGN PATENT DOCUMENTS

JP 4440090 1/2010
JP 2013028213 A 2/2013

OTHER PUBLICATIONS

U.S. Appl. No. 14/643,364, filed Mar. 10, 2015, Takahashi.

*Primary Examiner* — Craig J Price
(74) *Attorney, Agent, or Firm* — Harness, Dickey & Pierce, P.L.C.

(57) ABSTRACT

A liquid fuel catcher has a case which defines a plurality of chambers formed as depressions in a passage so that a liquid fuel is accumulated. The case has a communicating portion which communicates the chambers in series at upper portions thereof. The case has openings at each bottom portions of the chambers. The case has a return passage which returns the liquid fuel accumulated in the chambers to a fuel tank. The liquid fuel catcher has a return valve. The return valve closes the return passage, when the liquid fuel level in the fuel tank exceeds a predetermined level. The return valve opens the return passage, when the liquid fuel level in the fuel tank is less than a predetermined level. The fuel returns to the fuel tank from the chambers through the return valve.

19 Claims, 11 Drawing Sheets

(51) Int. Cl.
  *G05D 7/01* (2006.01)
  *F02M 25/08* (2006.01)
(52) U.S. Cl.
  CPC ............... *F02M 2025/0863* (2013.01); *Y10T 137/3099* (2015.04); *Y10T 137/86187* (2015.04)
(58) Field of Classification Search
  CPC ........ B60K 15/03046; B60K 15/03514; B60K 15/03289; B29C 65/08; B29K 2059/00; B29L 2031/7172; B29L 2031/74; B29L 2031/96; F02M 37/103; F02M 37/20; F02M 25/0836; F02M 25/0872; F02M 2025/0863; F02M 37/22; F16K 24/042; Y10T 137/0874; Y10T 137/3099; Y10T 137/86324; Y10T 137/0486; Y10T 137/3084; Y10T 137/7426; Y10T 137/6004; Y10T 137/3009; Y10T 137/3087; Y10T 137/0826; Y10T 137/0777; Y10T 137/053; Y10T 137/86187; B01D 45/16; G05D 7/01
  USPC ......... 137/15.26, 39, 41, 43, 197, 198, 202, 137/315.08, 430, 587, 588, 571; 251/126, 251/127
  See application file for complete search history.

(56) References Cited

U.S. PATENT DOCUMENTS

| | | | | |
|---|---|---|---|---|
| 5,730,194 A * | 3/1998 | Foltz | ............... | B60K 15/04 137/588 |
| 5,832,950 A * | 11/1998 | Shimada | ......... | B60K 15/03519 137/202 |
| 6,343,590 B1 * | 2/2002 | Nagai | ............. | B60K 15/03504 123/518 |
| 6,405,747 B1 * | 6/2002 | King | ............... | B60K 15/03519 137/202 |
| 6,425,379 B2 * | 7/2002 | Shimamura | ...... | B60K 15/03519 123/516 |
| 6,439,206 B1 * | 8/2002 | Shimamura | ........ | F02M 25/0836 123/516 |
| 6,557,578 B2 * | 5/2003 | Shimamura | ...... | B60K 15/03519 137/202 |
| 6,591,855 B2 * | 7/2003 | Nishi | ............... | B60K 15/03519 137/202 |
| 6,959,720 B2 * | 11/2005 | Kurihara | .......... | B60K 15/03519 137/202 |
| 6,959,727 B2 * | 11/2005 | Krishnamoorthy | .... | B60K 15/04 137/151 |
| 7,152,586 B2 * | 12/2006 | Aoki | ................ | B60K 15/03519 123/516 |
| 7,503,343 B2 * | 3/2009 | Krishnamoorthy | .... | B60K 15/04 137/151 |
| 7,784,484 B2 * | 8/2010 | Furuya | .................. | F16K 24/044 137/202 |
| 8,042,523 B2 * | 10/2011 | Lee | ................. | B60K 15/03519 123/516 |
| 8,118,051 B2 * | 2/2012 | Arnalsteen | ....... | B60K 15/03519 137/202 |
| 8,689,816 B2 * | 4/2014 | Pifer | ..................... | F16K 24/044 123/518 |
| 8,720,472 B2 * | 5/2014 | Kito | ..................... | F16K 24/044 137/202 |
| 8,910,652 B2 * | 12/2014 | Nemeth | ............... | B60K 15/035 137/202 |
| 9,360,872 B2 * | 6/2016 | Pifer | ..................... | F16K 24/044 |
| 9,428,043 B2 * | 8/2016 | Marlow | .............. | B60K 15/035 |
| 9,492,765 B2 * | 11/2016 | Mihara | ................ | F16K 17/196 |
| 9,586,475 B2 * | 3/2017 | Honda | ................. | B60K 15/035 |
| 2010/0282335 A1 * | 11/2010 | Mills | ...................... | F16K 17/19 137/202 |
| 2013/0025700 A1 | 1/2013 | Kito et al. | | |
| 2013/0160867 A1 * | 6/2013 | Nemeth | ............... | B60K 15/035 137/202 |

\* cited by examiner

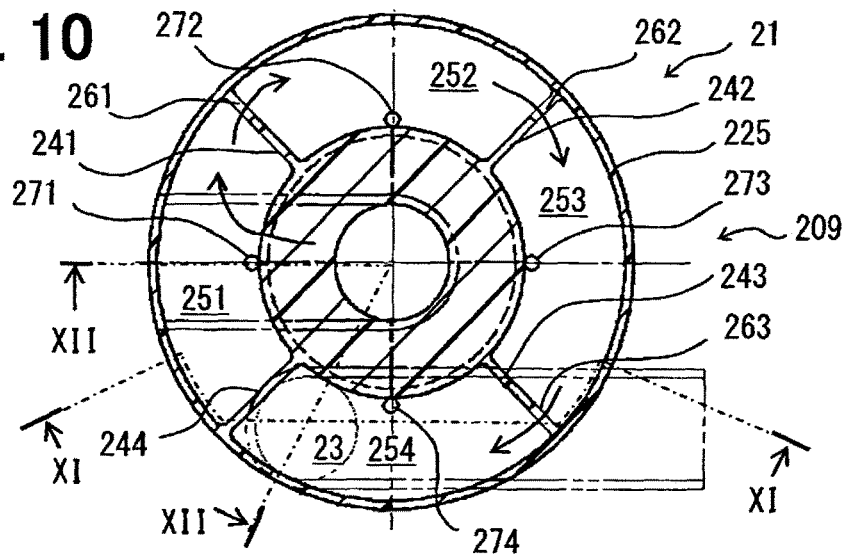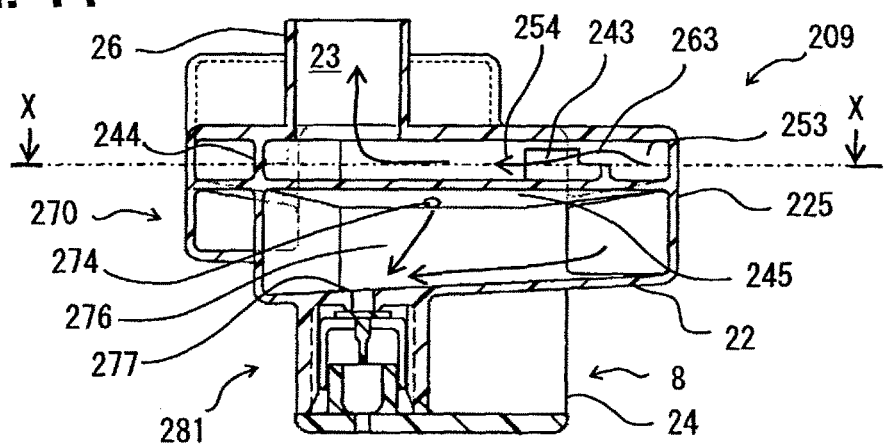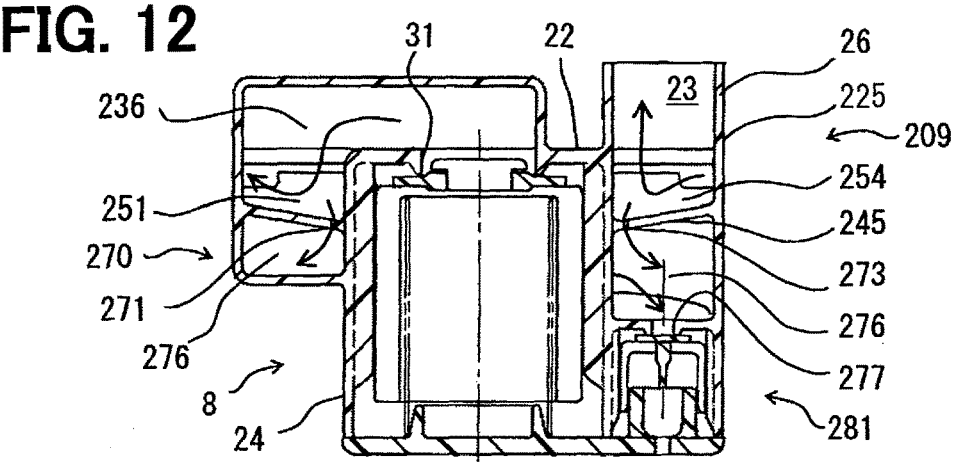

LIQUID FUEL CATCHER

CROSS REFERENCE TO RELATED APPLICATION

This application is a continuation-in-part of U.S. patent application Ser. No. 14/643,364 filed on Mar. 10, 2015. This application is based on Japanese Patent Applications No. 2015-156534 filed on Aug. 7, 2015 and No. 2014-53818 filed on Mar. 17, 2014, the disclosures of which are incorporated herein by reference.

TECHNICAL FIELD

The present disclosure relates to a liquid fuel catcher which catches a liquid fuel in a ventilation passage for a fuel tank, and which may be used for a fuel vapor processing system for reducing discharge of fuel vapor, which is generated in the fuel tank, to the air.

BACKGROUND

Patent Literature 1 discloses a fuel vapor processing system for reducing discharge of fuel vapor generated in the fuel tank to the air. Patent Literature 1 also discloses a structure for catching a liquid fuel in a case that the liquid fuel leaks to a passage for taking out fuel vapor from the fuel tank, and a structure for returning the liquid fuel to the tank again.

Patent Literature 1: JP4440090B

SUMMARY

According to the conventional structure, a single cavity is used for catching and accumulating the liquid fuel. Accordingly, it is impossible to catch a huge amount of liquid fuel. In addition, if a vehicle having the fuel tank is tilted or vibrated, it becomes hard or impossible to prevent outflow of the liquid fuel.

In the above viewpoint, or in the other viewpoint not mentioned above, further improvement of a liquid fuel catcher for a fuel vapor passage is still required.

It is one of object of the present disclosure to provide a liquid fuel catcher which has improved function for preventing outflow of the liquid fuel.

It is another object of the present disclosure to provide a liquid fuel catcher which is capable of catching liquid fuel and is easy to accumulate the liquid fuel.

It is still another object of the present disclosure to provide a liquid fuel catcher which is capable of catching the liquid fuel and of returning the liquid fuel to the fuel tank.

The present disclosure employs the following technical means, in order to attain the above-mentioned object.

According to the present disclosure, a liquid fuel catcher, which allows fuel vapor to pass through and catches a liquid fuel, the liquid fuel catcher comprising: a case which defines a passage through which fluid containing fuel vapor and the liquid fuel flows, wherein the case defines: a plurality of chambers defined as depressions on the passage so that the liquid fuel accumulates; a communicating portion which communicates the chambers in series at upper portions thereof; and a return passage which opens at each of bottom portions of the plurality of chambers and allows the liquid fuel accumulated in the chambers to return to a fuel tank, and wherein the liquid fuel catcher further comprises: a return valve which is disposed to open and close the return passage, returns liquid fuel to the fuel tank from the plurality of chambers, and prevents reverse flow of liquid fuel from the fuel tank to the plurality of chambers.

According to the disclosure, the plurality of chambers formed as depressions are disposed. These chambers are communicated in series. Accordingly, the liquid fuel spilled to the passage is caught by a plurality of chambers in an orderly manner of the chambers, and is accumulated therein. As a result, the liquid fuel is caught certainly. The return passages are disposed on the plurality of chambers, respectively. Accordingly, when the return valve is open, the liquid fuel can is returned from the plurality of chambers. Thereby, the plurality of chambers can become condition capable of accumulating a liquid fuel again. The return valve returns liquid fuel to the fuel tank from the plurality of chambers, and prevents reverse flow of fuel from the fuel tank to the plurality of chambers. Accordingly, it is prevented that a fuel flows in a reverse direction from the fuel tank to the chambers through the return passage.

According to the present disclosure, a liquid fuel catcher which allows fuel vapor to pass through and catches a liquid fuel is provided. The liquid fuel catcher comprises a case which defines a passage through which fluid containing fuel vapor and the liquid fuel flows. The case defines: a plurality of chambers defined as depressions on the passage so that the liquid fuel accumulates; a communicating portion which communicates the chambers in series at upper portions thereof; and a return passage which opens at each of bottom portions of the plurality of chambers and allows the liquid fuel accumulated in the chambers to return to a fuel tank. The liquid fuel catcher further comprises a return valve which closes the return passage when a liquid fuel level in the fuel tank is higher than a predetermined level, and opens the return passage when a liquid fuel level in the fuel tank is lower than a predetermined level to return the liquid fuel to the fuel tank from the plurality of chambers.

According to the disclosure, the plurality of chambers formed as depressions are disposed. These chambers are communicated in series. Accordingly, the liquid fuel spilled to the passage is caught by a plurality of chambers in an orderly manner of the chambers, and is accumulated therein. As a result, the liquid fuel is caught certainly. The return passages are disposed on the plurality of chambers, respectively. Accordingly, when the return valve is open, the liquid fuel can is returned from the plurality of chambers. Thereby, the plurality of chambers can become condition capable of accumulating a liquid fuel again. The return valve closes the return passage, when the level of liquid fuel in the fuel tank exceeds a predetermined level. Accordingly, it is prevented that a fuel flows in a reverse direction from the fuel tank to the chambers through the return passage.

In an embodiment, the case further defines: an inflow passage to a first chamber; and an outflow passage from a last chamber. The inflow passage and the outflow passage extend in different directions on a horizontal plane. The inflow passage and the outflow passage are extended in different directions on a horizontal plane, for example, in crossing directions and counter directions. Thereby, even if the liquid fuel catcher inclines, outflow of the liquid fuel is reduced.

In an embodiment, the case has a barrier wall which is disposed between the chambers to define the chambers, and wherein the communicating portion is formed on an upper portion of the barrier wall. The chambers are defined and formed by the barrier wall. The communicating portion is defined and formed by the barrier wall.

In an embodiment, the case has a bottom portion which defines lower part of the chambers and is inclined to descend toward the return passage. It is possible to flow the liquid fuel accumulated in the chambers toward the return passage by the bottom portion, and return the liquid fuel to the fuel tank.

In an embodiment, the plurality of chambers are arranged so that the passage curves. The plurality of chambers are arranged in a compact manner.

In an embodiment, the plurality of chambers are arranged circumferentially. The plurality of chambers are arranged in a compact manner.

In an embodiment, the liquid fuel catcher may further comprise a ventilation valve. The ventilation valve is disposed on the passage between the plurality of chambers and the fuel tank, and opens and closes communication between the fuel tank and the passage. The plurality of chambers are arranged on a lateral side of the ventilation valve.

The plurality of chambers are arranged beside the ventilation valve. That is, the ventilation valve and the plurality of chambers are arranged in a side by side manner with respect to the horizontal direction. As a result, the ventilation valve and the plurality of chambers can be arranged while reducing a size in the height direction.

In an embodiment, the ventilation valve is configured to open and close an opening positioned on a predetermined level with respect to the height direction. The plurality of chambers are defined to be depressions depressed downwardly from the opening. The return passage is located below the opening. The chambers are defined and formed so as to be depressions depressed downwardly more than the opening which is opened and closed by the ventilation valve. Accordingly, the liquid fuel entered from the opening is caught and accumulated by the chamber. In addition, in order to make it possible to define and form the chambers below the opening, the return passage is arranged below the opening.

In an embodiment, the return valve closes the return passage, when the liquid fuel level in the fuel tank exceeds a predetermined first level. The ventilation valve closes the opening when the liquid fuel level in the fuel tank exceeds a second level higher than the first level. The liquid fuel level at which the return valve closes the return passage is lower than the liquid fuel level at which the ventilation valve closes the opening. Accordingly, while preventing reverse flow of the liquid fuel through the return passage, the ventilation valve can be opened until the liquid fuel level reaches a high level.

In an embodiment, the ventilation valve opens the opening after the return valve opens in response to that the liquid fuel level in the fuel tank is less than the first level. In a case that the return valve opens in response to a descending fuel level, the ventilation valve opens after the return valve opens. Accordingly, additional inflow of the liquid fuel from the opening is reduced. The opening is opened after the liquid fuel is returned to the fuel tank from the return passage. Accordingly, even if the liquid fuel flow in again from the opening, the liquid fuel can be again caught by the plurality of chambers.

In an embodiment, the return passage has a plurality of switchable passages. The switchable passages are opened and closed by the return valve, respectively. The switchable passages open at the bottom portions of the plurality of chambers, respectively. The switchable passages are independent each other to prevent communicating flow of liquid fuel among the plurality of chambers. Since communication of the liquid fuel among the plurality of chambers can be prevented, it is possible to prevent that the liquid fuel reaches the downstream chamber.

In an embodiment, the return passage comprises: a normally open passage which opens at each bottom portion of the plurality of chambers; a collecting chamber which is disposed under the plurality of chambers, and is communicated with the plurality of normally open passages commonly; and a common passage which opens at a bottom portion of the collecting chamber and is opened and closed by the return valve. The liquid fuel is collected together in the collecting chamber from the plurality of chambers, and is returned to the fuel tank via the common passage. According to this structure, the return valve can be configured to open and close the common passage which is commonly formed for the chambers.

BRIEF DESCRIPTION OF THE DRAWINGS

The above and other objects, features and advantages of the present disclosure will become more apparent from the following detailed description made with reference to the accompanying drawings. In the drawings:

FIG. 10 is a cross sectional view showing a liquid fuel catcher on the horizontal plane along a line X-X in FIG. 11, according to a second embodiment of the present disclosure;

FIG. 11 is a cross sectional view on a line XI-XI in FIG. 10;

FIG. 12 is a cross sectional view on a line XII-XII in FIG. 10;

DETAILED DESCRIPTION

Referring to drawings, embodiments of the present disclosure will be described hereinafter. In the embodiments, the same parts and components as those in each embodiment are indicated with the same reference numbers and the same descriptions will not be reiterated. In a consecutive embodiment, a correspondence is shown by using a similar reference symbol in which only hundred and more digits differ to indicate a part corresponding to a matter described in the previous embodiment, and the same description may not be repeated. In a case that only a part of component or part is described, other descriptions for the other embodiment may be referenced or incorporated as descriptions for the remaining part of component or part.

First Embodiment

Figure 1:
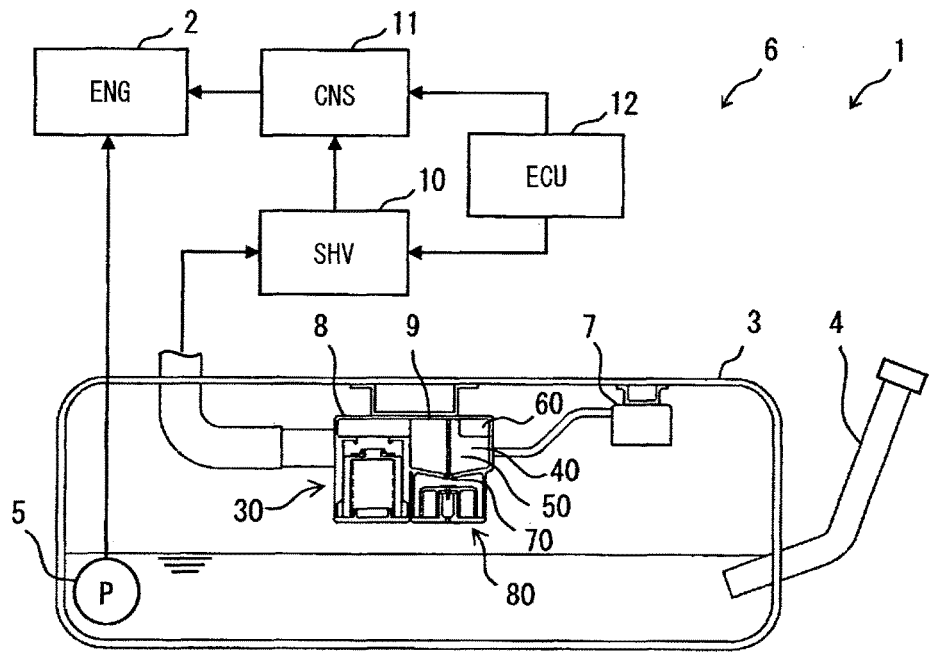
FIG. 1 is a block diagram showing a fuel vapor processing system according to a first embodiment of the present disclosure.

Referring to FIG. 1, the present disclosure is implemented as a power system 1 for a vehicle. The power system 1 for a vehicle has an engine (ENG) 2 mounted on the vehicle as a power source for the vehicle. The engine 2 is an internal combustion engine. The power system 1 for a vehicle has a fuel supply system for supplying a fuel to the engine 2. The fuel supply system has a fuel tank 3 for storing a fuel. A filler pipe 4 for fueling a fuel is disposed on the fuel tank 3. A liquid fuel is supplied from the filler pipe 4. The filler pipe 4 is projected into the fuel tank 3 as a cylindrical shape. The fuel supply system has a pump (P) 5 which supplies the liquid fuel in the fuel tank 3 to the engine 2. In the following description, unless otherwise stated, the word of a fuel means a liquid fuel.

In order to refueling a fuel in the fuel tank 3 from the filler pipe 4, it is necessary to discharge gas from the inside of the fuel tank 3. Gas contains air and fuel vapor which is vapor of the fuel. In the following description, fuel vapor and air containing fuel vapor are also called vapor. Recently, it is required to reduce an amount of vapor discharge to the air. The power system 1 for a vehicle has the fuel vapor processing system 6, i.e., a vapor control system 6, in order to reduce an amount of vapor discharge.

The vapor control system 6 supplies vapor to the engine 2 and burns for disposal. The vapor control system 6 provides a vapor passage which communicates the fuel tank 3 and the intake pipe of the engine 2. The vapor passage is a passage for ventilation in the fuel tank 3, and may also be referred to as a vent passage or a respiratory channel. The vapor passage provides a passage through which fuel vapor and liquid fuel flow. The vapor passage is provided by a plurality of components and pipes.

The vapor control system 6 has a cutoff valve 7, a ventilation valve 8, the liquid fuel catcher 9, a shut valve (SHV) 10, and a charcoal canister (CNS) 11 in the vapor passage. The canister 11 is disposed between the engine 2 and the fuel tank 3. The cutoff valve 7, the ventilation valve 8, and the liquid fuel catcher 9 are disposed between the canister 11 and the fuel tank 3. The cutoff valve 7, the ventilation valve 8, and the liquid fuel catcher 9 are in-tank components arranged in the fuel tank 3. The shut valve 10 is disposed between the canister 11 and the in-tank components. The liquid fuel catcher 9 is disposed between the shut valve 10 and the ventilation valve 8 or between the shut valve 10 and the cutoff valve 7. The liquid fuel catcher 9 may be disposed on a position where it can catch the liquid fuel, before the liquid fuel reaches the shut valve 10 and/or the canister 11 which are installed on the outside of the fuel tank 3.

The cutoff valve 7 is disposed on a communicating portion between the vapor passage and the inside of the fuel tank 3. The cutoff valve 7 disconnects a communication between the vapor passage and the inside of the fuel tank 3, if the liquid fuel level in the fuel tank 3 reaches a predetermined high level. The cutoff valve 7 prevents leakage of the fuel to the vapor passage by disconnecting communication between the vapor passage and the inside of the fuel tank 3 even in a case of rollover of the vehicle. For example, the cutoff valve 7 may have a structure similar to the below-mentioned ventilation valve 8. The cutoff valve 7 may be called by names, such as a ventilation valve for the fuel tank, or a control valve for controlling discharge of the fuel vapor.

The ventilation valve 8 is disposed on a communicating portion between the vapor passage and the inside of the fuel tank 3. The ventilation valve 8 provides a passage for discharging comparatively huge amount of fuel vapor to the vapor passage in order to enable rapid refueling to the fuel tank 3. The ventilation valve 8 disconnects a communication between the vapor passage and the inside of the fuel tank 3, if the liquid fuel level in the fuel tank 3 reaches a predetermined high level. For example, the ventilation valve 8 permits only a low-speed refueling by being turned to a closed condition, if the fuel level reaches a level which cannot permit a rapid refueling. The ventilation valve 8 prevents leakage of the fuel to the vapor passage by disconnecting communication between the vapor passage and the inside of the fuel tank 3 even in a case of rollover of the vehicle. The ventilation valve 8 may be called by names, such as a ventilation valve for refueling for controlling refueling speed to the fuel tank, or a control valve for controlling discharge of the fuel vapor.

The ventilation valve 8 has a float valve 30. The float valve 30 turns to an open condition and opens the passage, when the vehicle is in a normal position and the float valve 30 is not floated on the fuel. The float valve 30 turns to a close condition and closes the passage, when the vehicle is in a tilted position in an abnormal level, or the float valve 30 floats on the fuel, or the float valve 30 is sucked upwardly in an upside direction against the gravity.

The ventilation valve 8 selectively allows vapor to flow out from the fuel tank 3 to the vapor passage. The ventilation valve 8 can prevent vapor from flowing out to the vapor passage. The ventilation valve 8 opens to allow communication between the fuel tank 3 and the vapor passage, when an amount of the fuel in the fuel tank 3 is lower than a predetermined level during the vehicle is within a normal tilting range. The ventilation valve 8 turns to the closed condition to disconnect a communication between the vapor passage and the fuel tank 3, when the fuel amount in the fuel tank 3 reaches a predetermined high level. The ventilation valve 8 is also a float valve of which conditions are turned from the open condition to the closed condition, when the fuel reaches to the ventilation valve 8 by reaching a tilt angle of the vehicle to the abnormal range.

The liquid fuel catcher 9 is disposed between the fuel tank 3 and the canister 11 in order to prevent the liquid fuel from reaching to the canister 11 at least. The liquid fuel catcher 9 can be disposed in the vapor passage so as to catch at least the liquid fuel entered from the ventilation valve 8, or so as to catch both the liquid fuel entered from the cutoff valve 7 and the liquid fuel entered from the ventilation valve 8. The liquid fuel catcher 9 works to separate a liquid component and a gas component, and to pass the gas component to a downstream side, and to accumulate the liquid component. In addition, the liquid fuel catcher 9 returns the liquid component to the fuel tank 3. The liquid fuel catcher 9 may be called by names, such as a gas-liquid separator for separating the liquid component and the gas component, or a separator.

The liquid fuel catcher 9 provides a barrier wall 40 for catching a fuel while permitting vapor flow in the vapor passage. The liquid fuel catcher 9 provides a plurality of barrier walls 40. A plurality of chambers 50 are defined and formed by the plurality of barrier walls 40. The plurality of barrier walls 40 are provided by a case.

The plurality of chambers 50 are defined by the case. The plurality of chambers 50 are formed as depressions in the passage so that the liquid fuel is accumulated therein. Each of the chambers 50 has a bottom portion which is lower than the height of the vapor passage before and after the liquid fuel catcher 9 in the gravity direction. In other words, each of the chambers 50 has a portion deeper than the vapor passage before and after the liquid fuel catcher 9. Thereby, the chambers 50 functions also as a fuel reservoir which can accumulate the fuel caught.

The plurality of chambers 50 are connected in series via the communicating portion 60 disposed only on upper portions of the barrier walls 40. The communicating portion 60 is defined and formed by the case. The communicating portion 60 communicates the plurality of chambers 50 in series at upper portions thereof. The plurality of barrier walls 40 are disposed between adjacent chambers 50 to define and form the chambers 50. The communicating portion 60 is formed on upper portions of the plurality of barrier walls 40. Thereby, the vapor can flow through the plurality of chambers 50 via the communicating portion 60 in an orderly manner. On the other hand, the liquid fuel is accumulated in the lower part of the chambers 50 due to the weight itself.

The plurality of chambers 50 of the liquid fuel catcher 9 are arranged so that the vapor passage extends along a curved path. For example, the plurality of chambers 50 are arranged so that a vapor inflow direction to the first chamber and a vapor outflow direction from the last chamber are in an inverted relationship at least, i.e., in directions different at least by 180 angular degrees. This arrangement reduces possibility that the liquid fuel flows in towards the canister 11, even if the fuel tank 3 tilts from the proper position, e.g., even if the vehicle tilts. In a preferred embodiment, the plurality of chambers 50 are arranged to pass through a curved path on the horizontal plane. In another preferred embodiment, the plurality of chambers 50 are arranged annularly. Such a curved arrangement or an annular arrangement may contribute to widen a range of fuel-tank-tilt directions in which it is possible to prevent the liquid fuel from flowing out.

The liquid fuel catcher 9 has a return passage 70 for returning the fuel accumulated in the chamber 50 to the fuel tank 3. The return passage 70 is capable of communicating all the chambers 50 and the fuel tank 3. The return passage 70 opens at bottom portions of the plurality of chambers 50, respectively. The case has a bottom portion which defines and forms the lower part of the chambers 50 and is inclined to descend toward the return passage 70. The return passage 70 is disposed on the lower part of the chamber 50. The return passage 70 opens to the chamber 50 at a position close to the deepest part of the chamber 50, i.e., at a position close to a part positioned to the lowermost portion when the fuel tank 3 is in the proper posture. Thereby, the return passage 70 can return substantially all of the fuel caught by the liquid fuel catcher 9 to the fuel tank 3.

The liquid fuel catcher 9 further has a return valve 80 which opens and closes the return passage 70. The return valve 80 closes the return passage 70, when the liquid fuel level in the fuel tank 3 exceeds a predetermined level. This predetermined level corresponds to a high level near the full level. The return valve 80 opens the return passage 70, when the liquid fuel level in the fuel tank 3 is less than a predetermined level. Thereby, the return valve 80 returns the fuel to the fuel tank 3 from the plurality of chambers 50. As a result, when the fuel can be returned to the fuel tank 3 from the return passage 70, the fuel is returned to the fuel tank 3 from the return passage 70. Reverse flow of fuel from the fuel tank 3 to the return passage 70 is prevented. Furthermore, the return valve 80 also has a function as a rollover valve which closes the return passage 70, when the fuel tank 3 is not in a proper position due to a rollover of the vehicle or the like.

The return valve 80 has an open and close characteristic that is different from that of the ventilation valve 8. The open and close characteristic of the return valve 80 may be expressed by a relationship with the fuel level in the fuel tank 3.

During the fuel level in the fuel tank 3 increases, a height of the fuel level where the return valve 80 turns from the open condition to the close condition is lower than or equal to a height of the fuel level where the ventilation valve 8 turns from the open condition to the close condition. A valve seat of the ventilation valve 8 is positioned on a location higher than the valve seat of the return valve 80. The above-mentioned closing characteristic is effective to prevent reverse flow of the fuel passing through the return passage 70.

When the fuel level in the fuel tank 3 is low, the return valve 80 is easier to turn from the close condition to the open condition than that of the ventilation valve 8. Such an open characteristic can be given with the characteristic with respect to a pressure difference between the pressure in the vapor passage and the pressure in the fuel tank 3. For example, a pressure receiving surface area receiving the pressure difference may be set so that a pressure difference of turning the return valve 80 from the close condition to the open condition is higher than a pressure difference of turning the ventilation valve 8 from the close condition to the open condition. Thereby, it is possible to realize the open and close characteristic in which the return valve 80 opens previously, and then, the ventilation valve 8 opens after. The open characteristic may be set by a weight of the fuel accumulated in the chamber 50. Alternatively, the open characteristic may be set by using components, such as a weight of a movable valve member. According to this structure, after the fuel tank 3 is filled to the full level, i.e., in a case that a possibility of catching the fuel by the liquid fuel catcher 9 is sufficiently high, it is possible to discharge the fuel from the chamber 50 by opening the return valve 80 prior to opening the ventilation valve 8. Thereby, it is possible to promptly create a free volume for catching and accumulating the fuel. Accordingly, even if the fuel flows into the vapor passage again from the ventilation valve 8, this fuel can be caught and accumulated again.

The shut valve 10 is an opening and closing valve including an electromagnetic valve. The shut valve 10 may have an electromagnetic valve electrically switched to an open condition and a close condition, and a differential pressure valve switched to an open condition and a close condition according to a pressure difference adjusted by the electromagnetic valve. Since the differential pressure valve has a diaphragm displaced according to the pressure difference, it may also be referred to as a diaphragm valve. The shut valve 10 can switch communicating condition between the fuel tank 3 and the canister 11 to the open condition and the close condition. The shut valve 10 may have functions as a relief valve which changes from a close condition to an open condition, if the pressure on a side to the fuel tank 3 reaches an unusually high pressure. The shut valve 10 may be used for various purposes, such as a purpose for controlling vapor discharge from the fuel tank 3, and a purpose for intentionally switching the fuel tank 3 to a sealed condition and a communicated condition for an inspection.

The canister 11 absorbs and stores the vapor temporarily. The canister 11 has absorbent, such as active charcoal capable of absorbing the vapor. The canister 11 discharges the vapor by supplying a fresh air which contains less fuel vapor.

The vapor control system 6 has a controller (ECU) 12. The controller 12 controls the shut valve 10 to open and close the shut valve 10. The controller 12 controls the shut valve 10 for various purposes. For example, the controller 12 may control the shut valve 10 to adjust the vapor amount of supply from the fuel tank 3 to the canister 11. Alternatively, the controller 12 may control the shut valve 10 to switch the fuel tank 3 to the sealed condition and the communicated condition intentionally for an inspection. The controller 12 controls the canister 11 to control absorbing the vapor to the canister 11 and discharging the vapor from the canister 11. Specifically, the controller 12 opens and closes a plurality of channels connected to the canister 11. For example, the controller 12 controls a purge valve which opens and closes a purge channel which supplies a fresh air to the canister 11.

The controller 12 is an electronic control unit. The controller has at least one processing unit (CPU) and at least one memory as a storage medium which stores and memorizes a program and data. The controller is provided by a microcomputer which has a storage medium which can be read by computer. The storage medium is a non-transitory storage medium which stores a program readable by the computer. The storage medium may be provided with semiconductor memory or a magnetic disc. The controller may be provided with a computer or a set of computer resources linked by a data communication device. The program, when the controller executes the program, makes the controller to function as the apparatus described in this specification, and makes the controller to function to perform methods, such as control method, described in this specification. The controller provides various components. At least a part of the components may be referred to as means for performing function, and from the other viewpoint, at least a part of the components may be referred to as compositional block or module.

Figure 2:
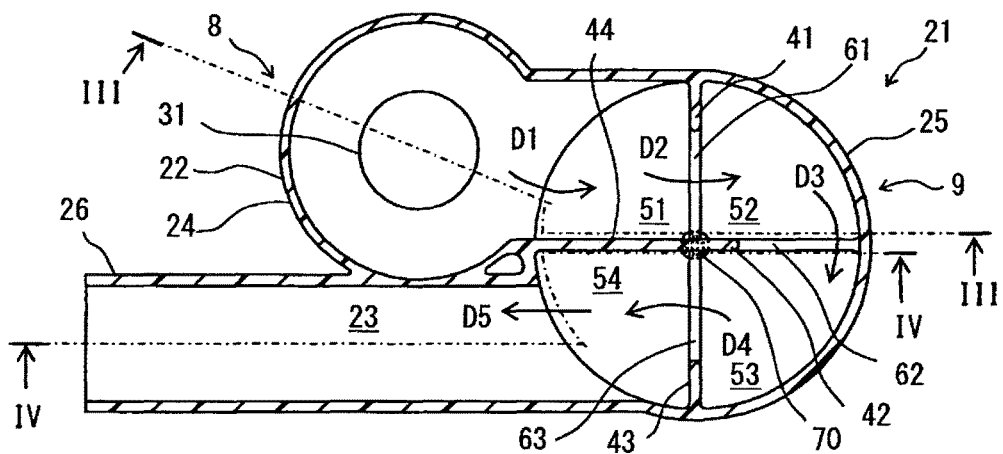
FIG. 2 is a cross sectional view showing a liquid fuel catcher on the horizontal plane along a line II-II in FIG. 3, according to the first embodiment.
Figure 3:
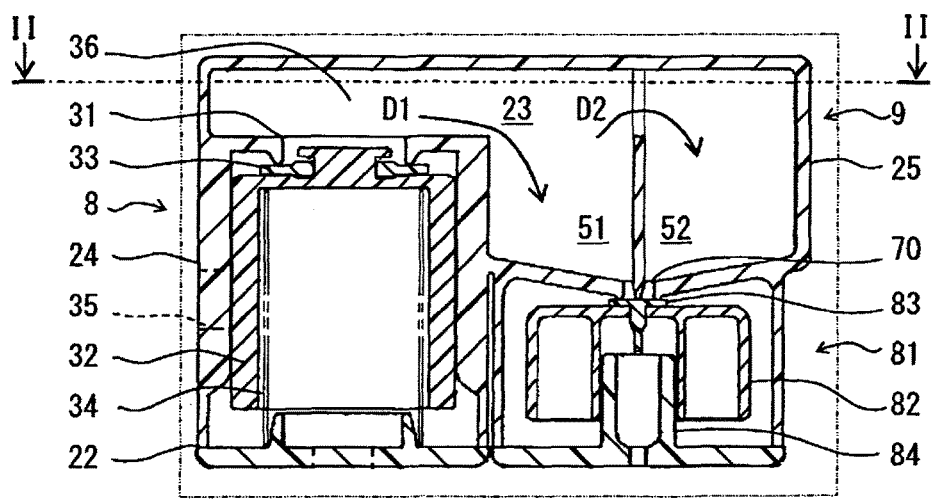
FIG. 3 is a cross sectional view on a line in FIG. 2.
Figure 4:
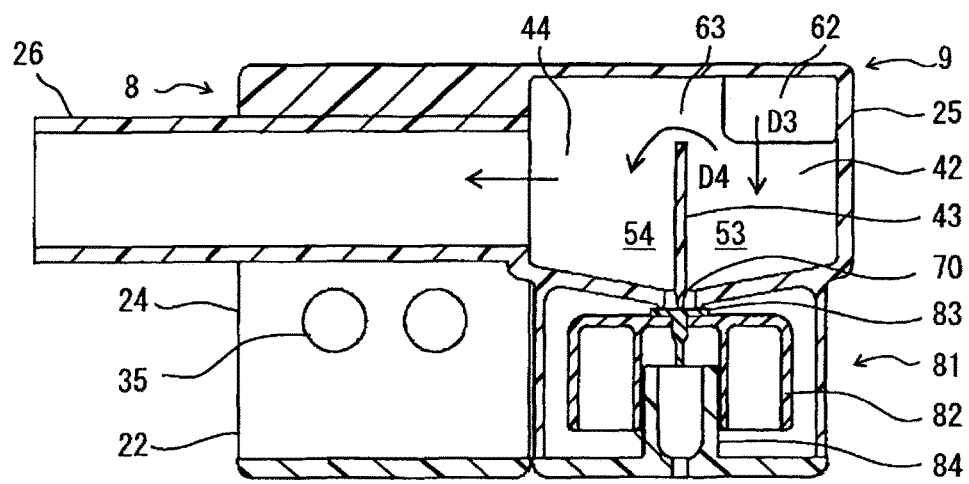
FIG. 4 is a cross sectional view on a line IV-IV in FIG. 2.

FIGS. 2, 3, and 4 show a parts assembly 21 containing the ventilation valve 8 and the liquid fuel catcher 9. FIG. 2 shows a cross-section on a line II-II in FIG. 3. FIG. 3 shows a cross-section on a line in FIG. 2. FIG. 4 shows a cross-section on a line IV-IV in FIG. 2. On the parts assembly 21, the ventilation valve 8 and the liquid fuel catcher 9 are integrally arranged by commonly using and sharing a case 22. The parts assembly 21 may also be referred to as a vapor control valve or a fuel vapor controller. The parts assembly 21 is designed to be set at a proper setting posture in which a moving direction of the below-mentioned floats 32 and 82 coincides with the gravity direction. In the following description, an up and down direction or a vertical direction means the gravity direction, and a lateral direction means a horizontal direction.

The ventilation valve 8 as a whole is configured as a cylindrical component. The liquid fuel catcher 9 is also configured as a cylindrical component. The ventilation valve 8 and the liquid fuel catcher 9 are arranged on a lateral direction in a side by side manner. The ventilation valve 8 and the liquid fuel catcher 9 shares the case 22 made of resin. In other words, the ventilation valve 8 and the liquid fuel catcher 9 are arranged on the case 22.

The case 22 defines and forms a vapor passage 23 which extends from the ventilation valve 8 and also extends through the liquid fuel catcher 9. The case 22 has a first case 24 formed in a cylindrical shape for forming the ventilation valve 8, and a second case 25 formed in a cylindrical shape for forming the liquid fuel catcher 9. The first case 24 and the second case 25 are arranged in an adjacent manner. The case 22 has an outlet pipe 26 which extends outwardly from the second case 25 in the tangential straight direction. The outlet pipe 26 provides an outlet passage of the vapor in the parts assembly 21. The outlet pipe 26 may also be referred to as a connecting tube for providing a connection with other passage members, or a downstream pipe.

The outlet pipe 26 extends outwardly from the liquid fuel catcher 9, and extends on a radial outside of the ventilation valve 8 while contacting the ventilation valve 8. The vapor passage 23 extends in a U shape, while positioning the ventilation valve 8 on the one end thereof, and positioning the liquid fuel catcher 9 on a turning portion thereof. A part of the vapor passage 23 toward the liquid fuel catcher 9 from the ventilation valve 8 and a part of the vapor passage 23 extending outwardly from the liquid fuel catcher 9 are in a relationship inverted by substantially 180 angular degrees. In other words, the vapor passage 23 provided by the liquid fuel catcher 9 and the outlet pipe 26 is arranged to be wound around on a radial outside of the ventilation valve 8.

The ventilation valve 8 opens and closes the opening 31 disposed on the upper portion of the first case 24 formed in a cylindrical shape. Opening 31 is disposed above an intermediate position in an up and down direction on the parts assembly 21. Such an arrangement of the opening 31 is designed in order to allow the fuel level to be able to reach the highest level in the fuel tank 3, and to reduce an amount of inflow of the fuel to the vapor passage 23 from the fuel tank 3 even when the fuel level is in the highest level.

The ventilation valve 8 has a float 32 which is a movable valve element accommodated in the first case 24. The float 32 is arranged under the opening 31. The float 32 is accommodated in a movable manner in an up and down direction. The float 32 is a bottom closed cylindrical member defining a cavity therein. The float 32 produces buoyancy in the fuel in an illustrated posture. The ventilation valve 8 has a seal member 33 disposed as a part of the float 32. The seal member 33 is a member for closing the opening 31 by contacting the opening 31. The ventilation valve 8 has a coil spring 34 which pushes the float 32 in an up direction in the drawing, i.e., toward a valve closing direction. The coil spring 34 is arranged to be in a slightly compressed condition. In the drawing, a close condition in which the float 32 closes the opening 31 is illustrated. When the float 32 does not sink in the liquid fuel, the float 32 moves downwardly against the coil spring 34 by its weight and opens the opening 31.

A plurality of parameters are set to adjust an open and close characteristic of the ventilation valve 8. The parameter includes force F1 created by the weight of the float 32, pushing force F2 created by the coil spring 34, the buoyancy F3 generated by the float 32, and close holding force F4 resulting from a pressure difference when the float 32 closes the opening 31. The close holding force F4 depends on a pressure in the vapor passage 23 in the close condition, a pressure in the fuel tank 3, a pressure receiving surface area on a side of the vapor passage 23, and a pressure receiving surface area on a side of the fuel tank 3.

In a phase in which the fuel level goes up, when the float 32 is soaked in the fuel to a predetermined floating height, e.g., about half of the overall height, the float 32 floats on the fuel by the buoyancy F3 of the float 32 and the pushing force F2 of the coil spring 34. At this time, F1 is smaller than or equal to a sum of F2 and F3 (F1$\Leftarrow$F2+F3). As the fuel level further goes up, the float 32 moves towards the close condition from the open condition. As the fuel level still further goes up, the float 32 closes the opening 31 and turns to the close condition.

On the other hand, in a phase in which the fuel level goes down, i.e., descends, the close holding force F4 caused by the pressure difference in the close condition acts on the float 32. As the fuel level descends, the buoyancy F3 decreases, but the close holding force F4 maintains the float 32 in the close condition by resisting against the decrease of the buoyancy F3. Even if the fuel level falls under the floating height, the float 32 maintains the close condition. Furthermore, in this embodiment, the close holding force F4 is set so that it may exceed the buoyancy F3. Accordingly, even if the fuel level falls below the float 32, i.e., even if the whole body of the float 32 comes out upwards from the fuel level, the float 32 may be maintained in the close condition. Then, if the pressure difference is decreased by outflow of the vapor to the vapor passage, etc., the close holding force F4 decreases. If the close holding force F4 becomes small, the float 32 moves downward by its weight, and turns from the close condition to the open condition. At this time, F1 is greater than or equal to a sum of F2, F3 and F4 (F1>=F2+F3+F4).

A plurality of communicating ports 35, which communicate an outside and an inside of the first case 24, are disposed on the first case 24. These communicating ports 35 are used as inlet ports for introducing the vapor and the liquid fuel. The first case 24 and the second case 25 have the inflow passage 36, which is communicated with the liquid fuel catcher 9, at an upper portion above the opening 31.

The liquid fuel catcher 9 is disposed on the second case 25 formed in a cylindrical shape. The second case 25 formed in a cylindrical shape has a cover portion, a body portion formed in a cylindrical shape, and a bottom portion formed in a conical shape which becomes thinner toward the bottom. The liquid fuel catcher 9 has a plurality of barrier walls 41, 42, 43, and 44 which partition the cavity in the second case 25. These barrier walls 41-44 extend in the vertical direction. These barrier walls 41-44 are arranged in a cross shape. The plurality of barrier walls 41-44 divide a columnar space into four equally.

A plurality of chambers 51, 52, 53, and 54 are defined and formed in the second case 25 by the plurality of barrier walls 41-44. These chambers 51-54 have a predetermined depth in the up and down direction. The chambers 51-54 have a bottom portion which is positioned low more downwardly than a bottom surface of the inflow passage 36 which is an inlet port of the liquid fuel catcher 9.

The inflow passage 36 communicates to the first chamber 51. Communicating portions 61, 62, and 63 which communicate two adjacent chambers are disposed on the barrier walls 41-43. The communicating portions 61-63 are provided by openings located on the almost same height as the inflow passage 36.

When the parts assembly 21 is positioned on a proper position, the lowest part of an edge defining the communicating portion 61-63 and the lowest part of an edge defining the inflow passage 36 are located at the almost same height. In another viewpoint, the height in which the opening 31 opens and the height of the lowest part of the communicating portions 61-63 are almost equal. Thereby, the chambers 51-54 formed by the barrier walls 41-44 are formed as depressions depressed downwardly to be lower than both the opening 31 and the inflow passage 36.

The barrier wall 44 partitioning the first chamber 51 and the last chamber 54 has no communicating portion. The communicating portion 61 opens at an upper edge of the barrier wall 41. The communicating portion 61 opens at a radial inside of the second case 25. The communicating portion 62 opens at an upper edge of the barrier wall 42. The communicating portion 62 opens at a radial outside of the second case 25. The communicating portion 63 opens at an upper edge of the barrier wall 43. The communicating portion 63 opens at a radial inside of the second case 25.

A passage in the outlet pipe 26 communicates to the last chamber 54. The passage provided by the outlet pipe 26 may also be referred to as an outflow passage. This outflow passage communicates to the liquid fuel catcher 9 at a portion lower than the inflow passage 36. As shown in FIG. 4, the highest part of the outflow passage is just slightly higher than the lowest part of the communicating portions 61-63. The lowest part of the outflow passage is lower than the communicating portions 61-63, and is positioned on a portion close to the bottom portion of the chambers 51-54. Therefore, outflow of the liquid fuel from the last chamber 54 to the outlet pipe 26 is easy. Therefore, in this embodiment, function of gas-liquid separation is provided by mainly using three barrier walls 41-43 and three chambers 51-53.

A sharply curving passage is formed in the second case 25 by placing the plurality of communicating portions 61-63 on different positions and not on the same positions with respect to the radial direction. The plurality of chambers 51-54 are connected in series via the communicating portions 61-63 disposed only on the upper portions of the barrier walls 41-43.

With this structure, the second case 25 defines and forms the inflow passage 36 to the first chamber 51 and the outflow passage 26 from the last chamber 54. The inflow passage 36 and the outflow passage 26 extend toward different directions on the horizontal plane. With this structure, as shown by arrows D1-D5 in FIGS. 2-4, the fluid containing the vapor and the liquid fuel flows. The fluid flows out of the opening 31 to the inflow passage 36. The fluid flows through the inflow passage 36 along with the arrow D1, and flows into the first chamber 51. Here, a liquid component flows towards the lower part of the chamber 51 due to the weight itself, and is separated from a gas component. As shown by the arrow D2, the fluid flows out from the chamber 51 by passing the communicating portion 61 and by flowing over the barrier wall 41.

The fluid flows into the chamber 52 as shown by the arrow D2. The fluid flows out from the chamber 52 by passing the communicating portion 62 and by flowing over the the barrier wall 42 as shown by the arrow D3. Here, the liquid component is also separated and flows towards the lower part of the chamber 52. Here, although the communicating portion 61 is located on the radial inside of the second case 25, the communicating portion 62 is located on the radial outside of the second case 25. As a result, a flow from the arrow D2 to the arrow D3 curves comparatively sharp. Thereby, separation of the liquid component in the chamber 52 is promoted.

The fluid flows into the chamber 53 as shown by the arrow D3. The fluid flows out from the chamber 53 by passing the communicating portion 63 and by flowing over the the barrier wall 43 as shown by the arrow D4. Here, the liquid component is also separated and flows towards the lower part of the chamber 53. Here, although the communicating portion 62 is located on the radial outside of the second case 25, the communicating portion 63 is located on the radial inside of the second case 25. As a result, a flow from the arrow D3 to the arrow D4 curves comparatively sharp. Thereby, separation of the liquid component in the chamber 53 is promoted.

The fluid flows into the last chamber 54 as shown by the arrow D4. The fluid flows out to the outlet pipe 26 from the chamber 54, which is deep, as shown by the arrow D5. Here, the liquid component is also separated and flows towards the lower part of the chamber 54.

The liquid component flows to the lower part of the chambers 51-54 during the process in which the fluid flows through the plurality of chambers 51-54. On the other hand, the vapor flows through the plurality of chambers 51-54 in an orderly manner via the communicating portions 61-63, and flows out to the outlet pipe 26. As a result, the plurality of chambers 51-54 separate, catch, and accumulate the liquid component in a repeated manner.

The plurality of chambers 51-54 are arranged to go around the inside of the second case 25 formed in a cylindrical shape. Accordingly, the fluid flows along a U shape. In addition, two or more deeps chambers are arranged in the passage of the U shape. Accordingly, the liquid fuel is caught and accumulated by either one of the chambers. As viewing as a whole, the arrow D1 showing an inflow direction to the first chamber 51 and the arrow D5 showing an outflow direction from the last chamber 54 are arranged in an inverted relation, i.e., so as to differ by 180 angular degrees. This arrangement reduces possibility that the fuel flows in towards the canister 11, even if the fuel tank 3 is tilted from the proper posture, e.g., even if the vehicle is tilted.

In this embodiment, the plurality of chambers 51-54 are arranged to go around periphery of an axis of the second case 25. Such the arrangement contributes to increase possibility of preventing out flow of the fuel even if the liquid fuel catcher 9 is tilted.

The liquid fuel catcher 9 has a return passage 70 for returning the fuel accumulated in the chambers 51-54 to the fuel tank 3. The return passage 70 can communicate all the chambers 51-54 and the fuel tank 3. The return passage 70 is disposed on the lowest location of the bottom portion of the chambers 51-54. Thereby, the return passage 70 can return all fuel caught by the liquid fuel catcher 9 to the fuel tank 3. The return passage 70 is formed to be opened at the apex portion of the bottom portion formed in a conical shape.

Figure 5:
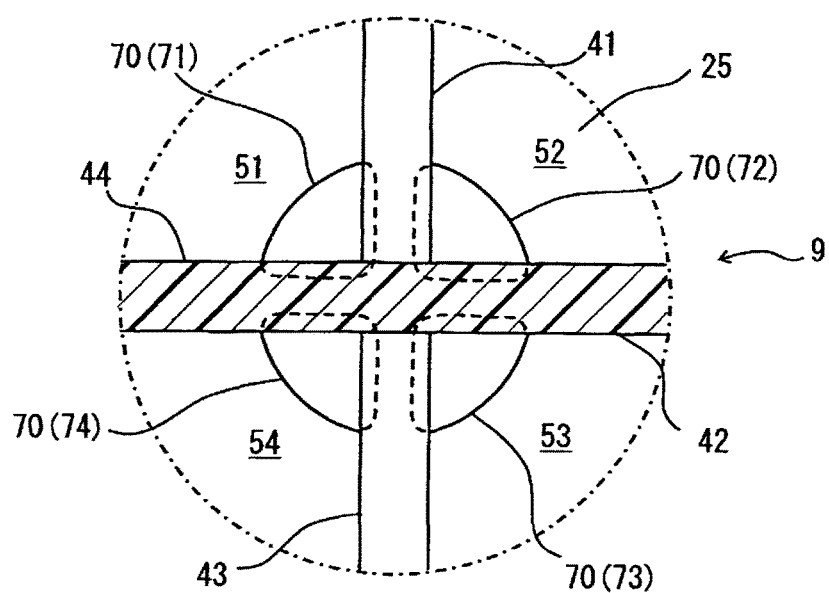
FIG. 5 is a partial cross sectional view showing an enlarged view of a center portion of FIG. 2.

FIG. 5 is an enlarged view showing the return passage 70. The return passage 70 includes four passages 71, 72, 73, and 74 which opens to the chambers 51-54, in a one by one manner. These passages 71-74 are formed by dividing a circular area equally into four parts. The passages 71-74 open at the bottom portion in a partitioned manner. Four openings corresponding to each of the passages 71-74 open on the lower surface of the bottom portion.

The return passage 70 of this embodiment has a plurality of passages 71-74. The passages 71-74 are opened and closed by the return valve 80, respectively. The passages 71-74 open at the bottom portions of the plurality of chambers 51-54, respectively. The passages 71-74 are independent each other to prevent communicating flow of liquid fuel among the plurality of chambers 51-54. This structure makes it possible to close all the four passages 71-74 by a single movable valve element. This structure also makes it possible to prevent communicating flow among the four passages 71-74. By preventing communication among the four passages 71-74, leakage of the liquid fuel from one chamber to another chamber is reduced. These passages 71-74 are also called as switchable passages or open-and-close passages.

Returning to FIG. 2, FIG. 3, and FIG. 4, the liquid fuel catcher 9 further has a float valve 81 as a return valve 80 which opens and closes the return passage 70. The float valve 81 may also be referred to as a sub float valve in the parts assembly 21. The ventilation valve 8 may also be referred to as a main float valve in the parts assembly 21.

The float valve 81 has a float 82 supported in a movable manner in an up and down direction. The float 82 has a seal member 83 which can opens and closes four passages 71-74 simultaneously. The float valve 81 has a guide portion 84 which guides the float 82. The guide portion 84 is provided by a part of the case 22.

A passage area of the return passage 70 opened and closed by the float valve 81 is small enough compared with an area of the opening 31. Accordingly, an effect of the pressure difference received when the float valve 81 turns from the close condition to the open condition is small compared with the ventilation valve 8. Accordingly, in condition where the buoyancy by the fuel is lost, the float valve 81 can turn to the open condition more easily than the ventilation valve 8. In a case that the liquid fuel is accumulated in the chambers 51-54, the weight of the liquid fuel also makes the float valve 81 to open easy. As a result, a characteristic in which the float valve 81 opens prior to the ventilation valve 8 is realized.

In this embodiment, in order to enable fueling into the fuel tank 3, the ventilation valve 8 is configured to open and close the opening 31 located on a predetermined level with respect to the height direction. The plurality of chambers 51-54 are defined and formed to be depressed downwardly lower than the opening 31. The return passage 70 is located below the opening 31. Thereby, the plurality of chambers 51-54 are defined to be depressions depressed downwardly from the opening 31 which is opened and closed by the ventilation valve 8. Accordingly, a liquid fuel entered from the opening 31 is caught by the chambers 51-54, and puddled therein. Furthermore, the return passage 70 is arranged below the opening 31 so that it may make it possible to form the chambers 51-54 below the opening 31.

FIG. 6, FIG. 7, FIG. 8, and FIG. 9 show change of the fuel level in the fuel tank 3 and change of open and close condition of the ventilation valve 8 and the float valve 81. The ventilation valve 8 and the float valve 81 are set so that, when the fuel level ascends, the float valve 81 turns to the close condition from the open condition at a first fuel level, and the ventilation valve 8 turns to the close condition from the open condition at a second fuel level which is further higher than the first fuel level. Thereby, it is prevented that the fuel flows in from the return passage 70 lower than the opening 31. Alternatively, the ventilation valve 8 and the float valve 81 may be set so that the float valve 81 and the ventilation valve 8 turn to the close condition from the open condition simultaneously at the first fuel level. On the other hand, the ventilation valve 8 and the float valve 81 are set so that, when the fuel level descends, the float valve 81 turns to the open condition from the close condition at a third fuel level, and later, the ventilation valve 8 turns to the open condition from the close condition.

Figure 6:
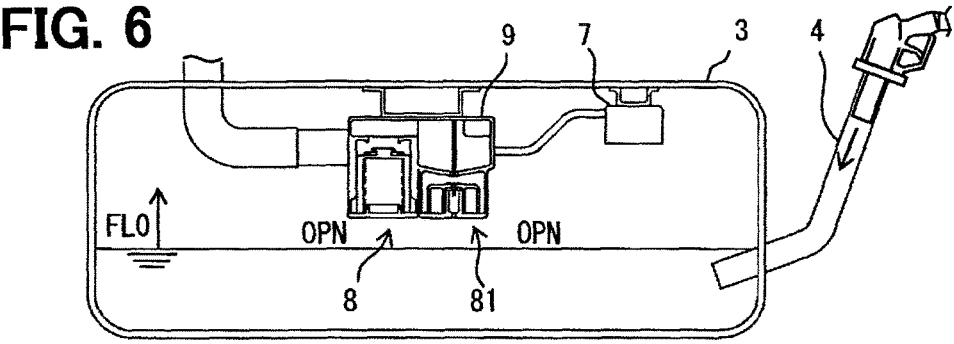
FIG. 6 is a cross sectional view of a fuel tank in a phase in which a fuel level goes up.

FIG. 6 shows condition in which the fuel level is in a fuel level FL0 which does not reach the ventilation valve 8 and the float valve 81. At this time, both the ventilation valve 8 and the float valve 81 are in the open condition OPN. As a result, the inside of the fuel tank 3 is communicated with the vapor passage through the ventilation valve 8. In this condition, the vapor in the fuel tank 3 can be discharged towards the vapor passage and the vapor control system 6. Therefore, it is possible to refuel the fuel while blocking the filler pipe 4 to the air. Since the vapor is discharged from the inside of the fuel tank 3 to the vapor passage, a lot of fuels can be supplied from the filler pipe 4. As a result, the fuel level goes up quickly.

Figure 7:
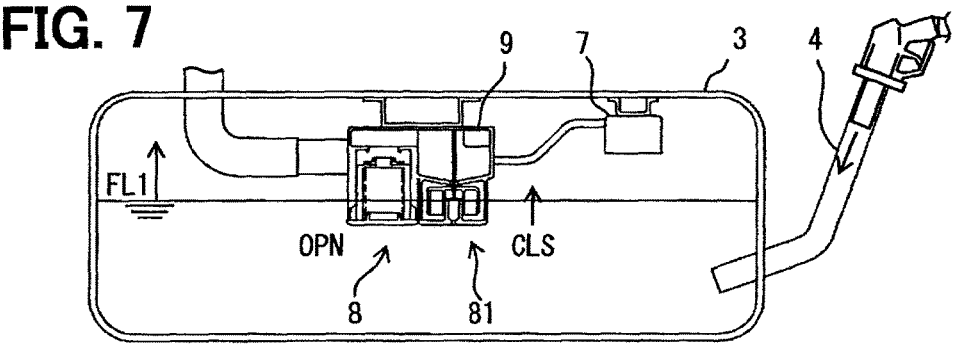
FIG. 7 is a cross sectional view of the fuel tank in a phase in which a fuel level goes up.

FIG. 7 shows condition in which the fuel level reached a first level FL1 where the float valve 81 turns to the close condition CLS from the open condition OPN. At this time, the float valve 81 turns to the close condition CLS from the open condition OPN. As a result, before the fuel level arrives to the return passage 70, the return passage 70 is closed. On the other hand, the opening 31 is located higher than the return passage 70. Therefore, the ventilation valve 8 is still in the open condition OPN, and permits a lot of fuelling in the first level FL1.

Figure 8:
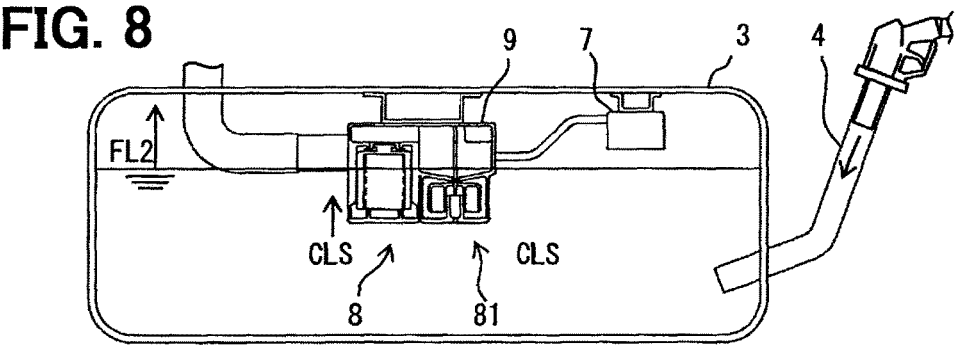
FIG. 8 is a cross sectional view of the fuel tank in a phase in which a fuel level goes up.

FIG. 8 shows condition in which the fuel level reached a second level FL2 where the ventilation valve 8 turns to the close condition CLS from the open condition OPN. At this time, the ventilation valve 8 turns to the close condition CLS from the open condition OPN. As a result, before the fuel level arrives to the opening 31, the opening 31 is closed. As the ventilation valve 8 is closed, it becomes difficult supply a lot of fuel from the filler pipe 4. Accordingly, a refueling operator shifts to a slow refueling with small amount. Then, a refueling operation to the fuel tank 3 is completed.

In this embodiment, the return valve 80 closes the return passage 70, when the liquid fuel level in the fuel tank 3 exceeds a predetermined first level FL1. The ventilation valve 8 closes the opening 31, when the liquid fuel level in the fuel tank 3 exceeds the second level FL2 which is higher than the first level FL1. The fuel level FL1 at which the return valve 80 closes the return passage 70 is lower than the fuel level FL2 at which the ventilation valve 8 closes the opening 31 (FL1<FL2). Accordingly, while preventing the reverse flow of the liquid fuel through the return passage 70, the ventilation valve 8 can be opened until the liquid fuel level reaches a high level.

In the above-mentioned refueling process, or in a vehicle driving process, there may be a case that the liquid fuel enters from the ventilation valve 8. In this case, the liquid fuel is caught by the chambers 51-54 and accumulated therein. In addition, the plurality of barrier walls 41-44 and the plurality of chambers 51-54 prevent the liquid fuel from entering one after another. Accordingly, incoming flow of the liquid fuel is prevented at the liquid fuel catcher 9.

Figure 9:
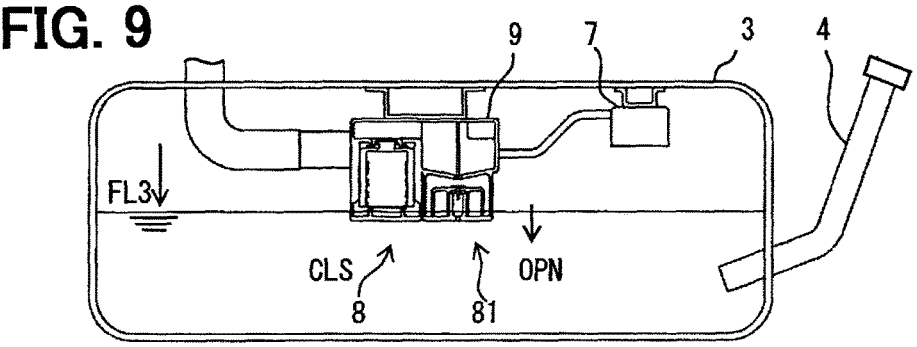
FIG. 9 is a cross sectional view of the fuel tank in a phase in which a fuel level goes down.

FIG. 9 shows process in which the fuel level in the fuel tank 3 descends. In the drawing, condition in which the fuel level is lowered to a third level FL3 where the float valve 81 turns to the open condition OPN from the close condition CLS. As the fuel level descends to the third level FL3, the float valve 81 turns to the open condition OPN. As a result, the liquid fuel currently accumulated in the chambers 51-54 is returned to the fuel tank 3 via the return passage 70. The vapor passage and the fuel tank 3 are communicated by being opened the float valve 81. Then, after that, if the pressure in the fuel tank 3 and the pressure in the vapor passage in the parts assembly 21 approach each other, the ventilation valve 8 turns to the open condition OPN from the close condition CLS.

In this embodiment, the ventilation valve 8 opens the opening 31 after the return valve 80 opens in response to that the liquid fuel level in the fuel tank 3 is less than the first level FL1. Therefore, in a case that the return valve 80 opens in response to a descending fuel level, the ventilation valve 8 is opened after the return valve 80 opens. Accordingly, an additional incoming flow the liquid fuel from the opening 31 is reduced. The opening 31 is opened after the liquid fuel is returned to the fuel tank 3 from the return passage 70. Accordingly, even if the liquid fuel may flow in again from the opening 31, the liquid fuel may be again caught by the plurality of chambers 50.

According to this embodiment, the liquid fuel catcher 9 with high performance for preventing the liquid fuel from flowing out is provided. In addition, the high performance is realized, while reducing the dimension in the height direction. Moreover, even in a case that the liquid fuel catcher 9 is disposed adjacent to the ventilation valve 8, an increase in the whole height is reduced.

According to this embodiment, a U shaped vapor passage is provided by the liquid fuel catcher 9. Accordingly, the outflow direction D1 from the opening 31 and the outflow direction D5 to the outlet pipe 26 can be made into an inverted direction. Thereby, even when the fuel tank 3 is tilted or shaken, it is possible to increase possibility that the liquid fuel is prevented from flowing out.

According to this embodiment, since a plurality of chambers 51-54 function as liquid reservoirs for accumulating the liquid fuel, even if some liquid fuel flows out of the opening 31, it is possible to delay arrival of the liquid fuel to the outlet pipe 26. Since the liquid fuel catcher 9 has the return passage 70 for all the plurality of chambers 51-54, the liquid fuel may be returned to the fuel tank 3 before the liquid fuel reaches to the outlet pipe 26. Since the float valve 81 is disposed on the return passage 70 as the sub float valve, it is possible to prevent a reverse flow of the fuel from the return passage 70. The return passage 70 for the plurality of chambers 51-54 is opened and closed by a single float valve 81. Thereby, the high performance can be provided with simple structure.

The float valve 81 turns to the close condition from the open condition at the fuel level FL1 which is lower than that for the ventilation valve 8 disposed as the main float valve. Thereby, leakage of the liquid fuel via the return passage 70 is prevented certainly. In this embodiment, the height direction location of the opening 31 opened and closed by the ventilation valve 8 is lower than the height direction location of the return passage 70 opened and closed by the float valve

81. This structure enlarges the depth of the chambers 51-54 for accumulating the liquid fuel, and contributes to increase an amount of fuel being accumulated therein. The float valve 81 turns to the open condition from the close condition prior to the opening event of the ventilation valve 8. Thereby, the liquid fuel accumulated in the chambers 51-54 can be returned to the fuel tank 3 at an early stage. As a result, it is possible to prepare for entering of the liquid fuel again.

Second Embodiment

This embodiment is one of modifications based on a basic form provided by the preceding embodiment. In the preceding embodiment, the liquid fuel catcher 9 is arranged beside the ventilation valve 8, i.e., on a lateral side, in a parallel arrangement. Alternatively, in this embodiment, a liquid fuel catcher 209 is arranged around the ventilation valve 8 to surround the ventilation valve 8. In embodiments described below, corresponding reference numbers in which only hundred digits differ are assigned to the corresponding elements already described in the preceding embodiments, and detailed explanation for those elements may be omitted. Descriptions in the preceding embodiments may be referred to for those elements.

FIG. 10 shows a cross sectional view on a plane of the parts assembly 21. FIG. 10 shows a cross-section on a line X-X in in FIG. 11. FIG. 11 shows a cross-section on a line XI-XI in FIG. 10. FIG. 12 shows a cross-section on a line XII-XII in FIG. 10.

The liquid fuel catcher 209 is arranged in an annular shape to surround the ventilation valve 8 on a radial outside of the ventilation valve 8. In this embodiment, the case 22 also has a first case 24 providing the ventilation valve 8, and a second case 225 providing the liquid fuel catcher 209. The first case 24 and the second case 225 are formed by combining many resin molded components. The second case 225 is formed as an annular cylindrical member larger in diameter than that of the first case 24 on a radial outside of the first case 24. The second case 225 is arranged to occupy an area which unevenly shifted to an upper portion of the first case 24. The second case 225 defines and forms an annular chamber on the radial outside of the first case 24. The second case 225 defines and forms the annular chamber which goes around the outside of the first case 24 around. It can be said that the second case 225 extends spirally. The shape of the second case 225 may also be referred to as a cochlear shape.

An inside of the second case 225 is partitioned into an upper annular chamber and a lower annular chamber by a partitioning wall 245. The partitioning wall 245 is extended over the entire periphery of the ventilation valve 8. The partitioning wall 245 is an annular plate which is held to be inclined so that a radial inside is slightly lower than a radial outside thereof.

The upper annular chamber is divided along a circumferential direction by a plurality of barrier walls 241, 242, 243, and 244. Therefore, a plurality of chambers 251, 252, 253, and 254 are defined and formed in the upper annular chamber. The chambers 251-254 surround the ventilation valve 8. The barrier walls 241-243 have communicating portions 261-263, respectively. These communicating portions 261-263 communicate the chambers next to each other. The communicating portions 261-263 are disposed in a shifted manner to a radial outside. Thereby, a long vapor passage 23 is formed.

The liquid fuel catcher 209 has a return passage 270. The return passage 270 has a collecting chamber 276 provided by the lower annular chamber. The collecting chamber 276 has a large volume which can function as a liquid reservoir for accumulating a liquid fuel. In the illustrated example, the volume of the collecting chamber 276 is larger than the total volume of the plurality of chambers 251-254. The collecting chamber 276 has a bottom portion which downwardly extends gradually to go down from a portion under the first chamber 251 to a portion under the last chamber 254. As a result, the second case 225 presents a shape which may be referred to as a cochlear shape.

Four passages 271, 272, 273, and 274 each of which communicates among each of the chambers 251-254 and the collecting chamber 276 are disposed on the partitioning wall 245. Each of the passages 271-274 opens at lowest portion of each of the chambers 251-254. The passages 271-274 are set in a size which allows the liquid fuel flows down from the chambers 251-254 to the collecting chamber 276. The passages 271-274 are formed small enough in order to prevent reverse flow of the liquid fuel from the collecting chamber 276 to the chambers 251-254. Thereby, even if the liquid fuel accumulated in the collecting chamber 276 is shaken and splash reaches to the passages 271-274, the reverse flow to the chambers 252-254 is reduced. Since the passages 271-274 always communicate among the chambers 251-254 and the collecting chamber 276, it may also be referred to as a normally open passage.

A common passage 277 common to the plurality of chambers 251-254 is formed at the bottom portion of the collecting chamber 276. The common passage 277 opens at a location close to the lowest location of the collecting chamber 276.

A float valve 281 which opens and closes the common passage 277 at a lower portion of the common passage 277 is disposed on a lower part of the liquid fuel catcher 209. The float valve 281 has components and functions corresponding to the float valve 81 in the above-mentioned embodiment.

The opening 31 of the ventilation valve 8 and the first chamber 251 are communicated by the inflow passage 236. The outlet pipe 26 extends upwardly from the last chamber 254. The outlet pipe 26 may be connected with or replaced with an elbow pipe which curves toward the horizontal direction and extends horizontally.

In this embodiment, the vapor passage 23 which communicates the ventilation valve 8 and the inside of the outlet pipe 26 is provided. The vapor passage 23 has a long length by arranged to go around the perimeter of the ventilation valve 8. The vapor flowed out of the ventilation valve 8 reaches to the outlet pipe 26 mainly through the plurality of chambers 251-254. As the liquid fuel flows in from the ventilation valve 8, the liquid fuel flow is blocked by the barrier walls 241-244, and flows into the collecting chamber 276 via the passages 271-274. The partitioning wall 245 and the small passages 271-274 formed thereon reduce reverse flow of the liquid fuel from the collecting chamber 276 to the plurality of chambers 251-254. The fuel flowed into the collecting chamber 276 flows downwardly along the bottom portion, and reaches the common passage 277. The liquid fuel accumulated in the collecting chamber 276 will be returned to the fuel tank 3, if the float valve 281 opens.

According to this embodiment, it is possible to dispose the liquid fuel catcher 209 by using a circumferential part of the ventilation valve 8. As a result, the plurality of chambers 251-254 are arranged so that the passage 23 curves. It can be said that the plurality of chambers 251-254 are arranged circumferentially. This structure makes it possible to arrange the plurality of chambers 251-254 compactly.

Since the chambers 251-254 of the upper portion through which the vapor mainly flows and the collecting chamber 276 for accumulating the liquid fuel are defined on an upside and a downside by the partitioning wall 245, flowing out of the liquid fuel can be reduced certainly.

In this embodiment, the return passage 270 is employed. The return passage 270 has passages 271-274 each of which opens at a bottom portion of each of the plurality of chambers 251-254. The return passage 270 is disposed under the plurality of chambers 251-254, and has the collecting chamber 276 to which the plurality of passages 271-274 communicate in common. The return passage 270 opens at a bottom portion of the collecting chamber 276, and has a common passage 277 which is opened and closed by the return valve 80. According to the embodiment, the liquid fuel is collected to the collecting chamber 276 from the plurality of chambers 251-254, and is returned to the fuel tank 3 via the common passage 277.

According to the embodiment, the return valve 80 may be configured to open and close the common passage 277 formed commonly for the chambers. According to the embodiment, since the single common passage 277 is opened and closed by the float valve 281 after passing through the collecting chamber 276, the fuel can be returned to the fuel tank 3 by a simple structure.

Third Embodiment

This embodiment is one of modifications based on a basic form provided by the first embodiment. In this embodiment, two chambers 351 and 352 are disposed as a plurality of chambers.

Figure 13:
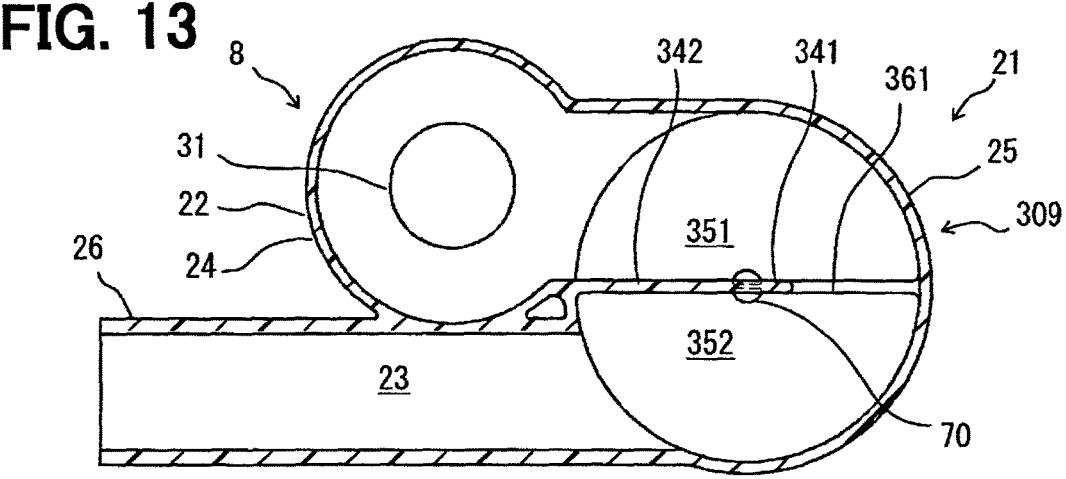
FIG. 13 is a cross sectional view showing a liquid fuel catcher on the horizontal plane according to a third embodiment of the present disclosure.

As shown in FIG. 13, the liquid fuel catcher 309 has two barrier walls 341 and 342 disposed in the second case 25. A through hole 361 is formed on the barrier wall 341. Thereby, two chambers 351 and 352 are defined and formed. The return passage 70 opens at bottom portions of all the chambers 351 and 352. The return passage 70 allows the fuel to flow downwardly from the chambers 351 and 352 to the fuel tank 3, i.e., allows the fuel to return, without permitting fuel communication between the chambers 351 and 352 each other. The return passage 70 has two passages.

Fourth Embodiment

This embodiment is one of modifications based on a basic form provided by the first embodiment. In this embodiment, three chambers 451, 452 and 453 are disposed as a plurality of chambers.

Figure 14:
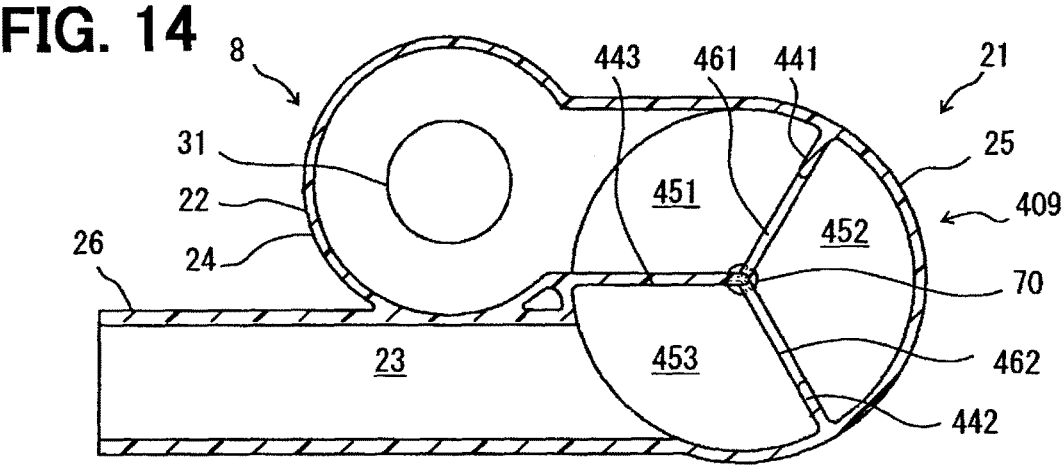
FIG. 14 is a cross sectional view showing a liquid fuel catcher on the horizontal plane according to a fourth embodiment of the present disclosure.

As shown in FIG. 14, the liquid fuel catcher 409 has three barrier walls 441, 442, and 443 disposed in the second case 25. Through holes 461 and 462 are formed on the barrier walls 461 and 462, respectively. Thereby, three chambers 451, 452 and 453 are defined and formed. The return passage 70 opens at bottom portions of all the chambers 451, 452 and 453. The return passage 70 allows the fuel to flow downwardly from the chambers 451, 452 and 453 to the fuel tank 3, i.e., allows the fuel to return, without permitting fuel communication among the chambers 451, 452 and 453 each other. The return passage 70 has three passages.

Fifth Embodiment

This embodiment is one of modifications based on a basic form provided by the first embodiment. In this embodiment, five chambers 551, 552, 553, 554, and 555 are disposed as a plurality of chambers. In addition, in this embodiment, the plurality of chambers 551-554 with different volume are adopted.

Figure 15:
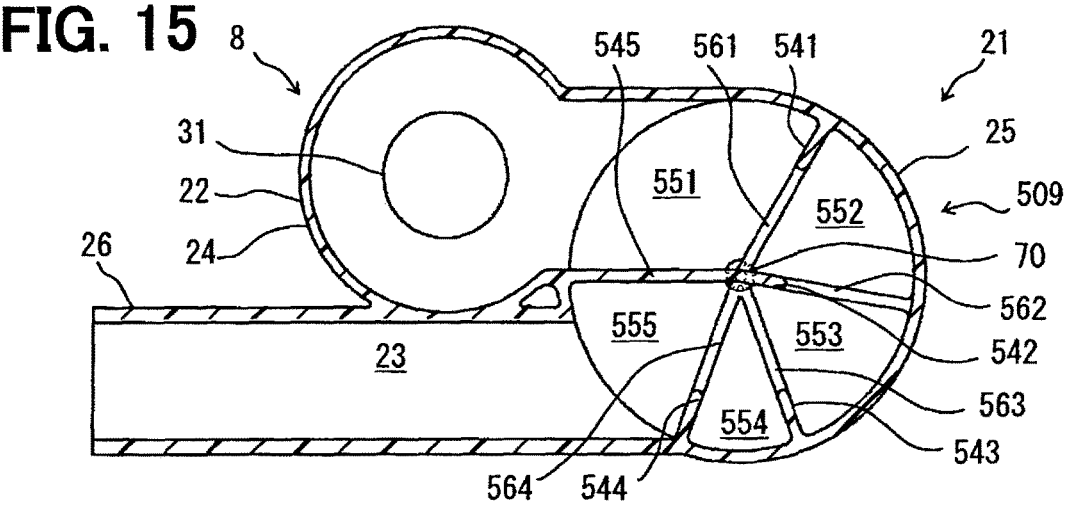
FIG. 15 is a cross sectional view showing a liquid fuel catcher on the horizontal plane according to a fifth embodiment of the present disclosure.

As shown in FIG. 15, the liquid fuel catcher 509 has five barrier walls 541, 542, 543, 544 and 545 disposed in the second case 25. The communicating portions 561, 562, 563, and 564 are disposed on the barrier walls 541, 542, 543, and 544, respectively. Thereby, five chambers 551-555 are defined and formed. The return passage 70 opens at bottom portions of all the chambers 551-555. The return passage 70 allows the fuel to flow downwardly from the chambers 551-555 to the fuel tank 3, i.e., allows the fuel to return, without permitting fuel communication among the chambers 551-555 each other. The return passage 70 has five passages.

In this embodiment, in order to set different volumes for the plurality of chambers 551-554, the plurality of barrier walls 541-544 are arranged at uneven intervals. The plurality of chambers 551-554 are formed so that the volume may vary in a stepping manner from an inlet side towards an outlet side. More specifically, the plurality of chambers 551-554 are formed so that the volume decrease in a stepping manner towards the outlet side from the inlet side. This structure makes it possible to accumulate more amount of liquid fuel in the chamber at an upstream side.

Sixth Embodiment

This embodiment is one of modifications based on a basic form provided by the second embodiment. In this embodiment, two chambers 651 and 652 are disposed as a plurality of chambers.

Figure 16:
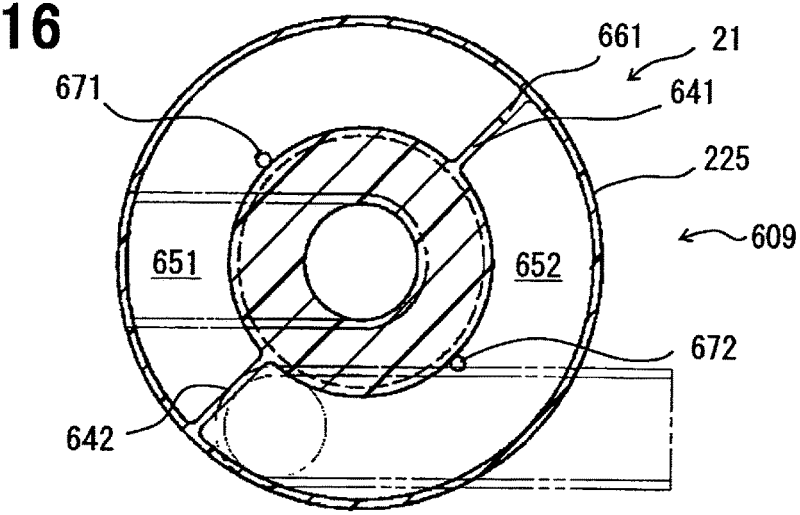
FIG. 16 is a cross sectional view showing a liquid fuel catcher on the horizontal plane according to a sixth embodiment of the present disclosure.

As shown in FIG. 16, the liquid fuel catcher 609 has two barrier walls 641 and 642 disposed in the second case 225. A communicating portion 661 is formed on the barrier wall 641. Thereby, two chambers 651 and 652 are defined and formed. In this embodiment, two passages 671 and 672 corresponding to the passages 271-274 in the preceding embodiments are disposed.

Seventh Embodiment

This embodiment is one of modifications based on a basic form provided by the second embodiment. In this embodiment, three chambers 751, 752 and 753 are disposed as a plurality of chambers.

Figure 17:
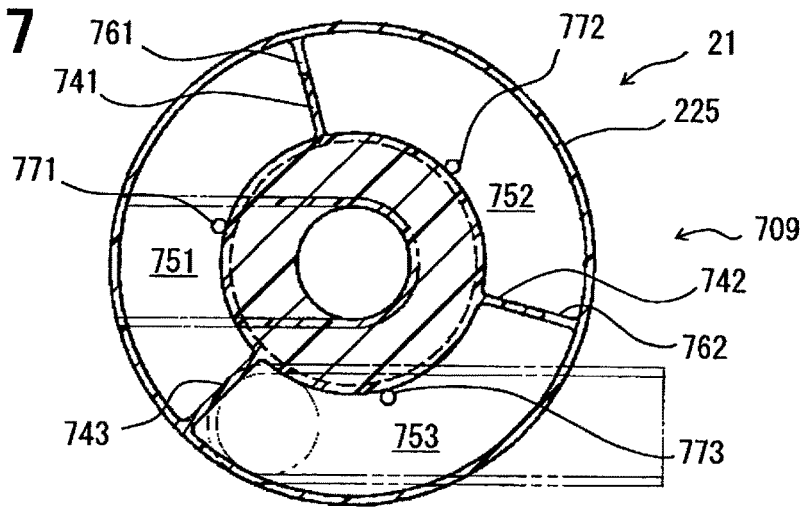
FIG. 17 is a cross sectional view showing a liquid fuel catcher on the horizontal plane according to a seventh embodiment of the present disclosure.

As shown in FIG. 17, the liquid fuel catcher 709 has three barrier walls 741, 742 and 743 disposed in the second case 225. Communicating portions 761 and 762 are formed on the barrier walls 741 and 742, respectively. Thereby, three chambers 751, 752, and 753 are defined and formed. In this embodiment, three passages 771, 772, and 773 corresponding to the passages 271-274 in the preceding embodiments are disposed.

Eighth Embodiment

This embodiment is one of modifications based on a basic form provided by the second embodiment. In this embodiment, five chambers 851, 852, 853, 854, and 855 are disposed as a plurality of chambers. In addition, in this embodiment, a plurality of chambers 851-854 with different volume are adopted.

Figure 18:
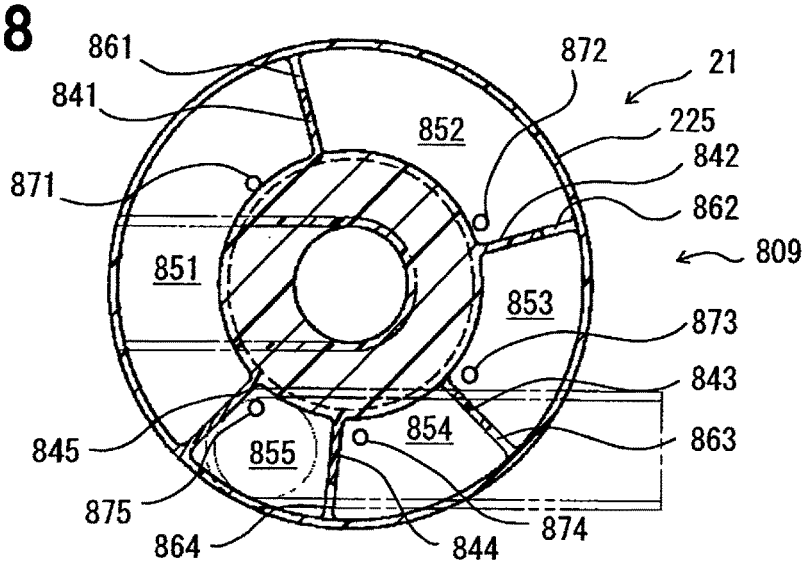
FIG. 18 is a cross sectional view showing a liquid fuel catcher on the horizontal plane according to an eighth embodiment of the present disclosure.

As shown in FIG. 18, the liquid fuel catcher 809 has five barrier walls 841, 842, 843, 844, and 845 disposed in the second case 225. The communicating portions 861, 862, 863, and 864 are disposed on the barrier walls 841, 842, 843, and 844, respectively. Thereby, five chambers 851, 852, 853, 854, and 855 are defined and formed. In this embodiment, five passages 871, 872, 873, 874, and 875 corresponding to the passages 271-274 in the preceding embodiments are disposed.

In this embodiment, in order to set different volume in the plurality of chambers 851-854, the plurality of barrier walls 841-844 are arranged at uneven intervals. The plurality of chambers 851-854 are formed so that the volume may vary from an inlet side towards an outlet side in a stepping manner. More specifically, the plurality of chambers 851-854 are formed so that the volume decrease from the inlet side towards the outlet side in a stepping manner. This structure makes it possible to accumulate more amount of liquid fuel in the chamber on an upstream side.

Ninth Embodiment

This embodiment is one of modifications based on a basic form provided by the preceding embodiment. In the preceding embodiments, a plurality chambers are arranged to go around. Alternatively, in this embodiment, a plurality of chambers 951, 952, and 953 are arranged along a straight line in a side by side manner.

Figure 19:
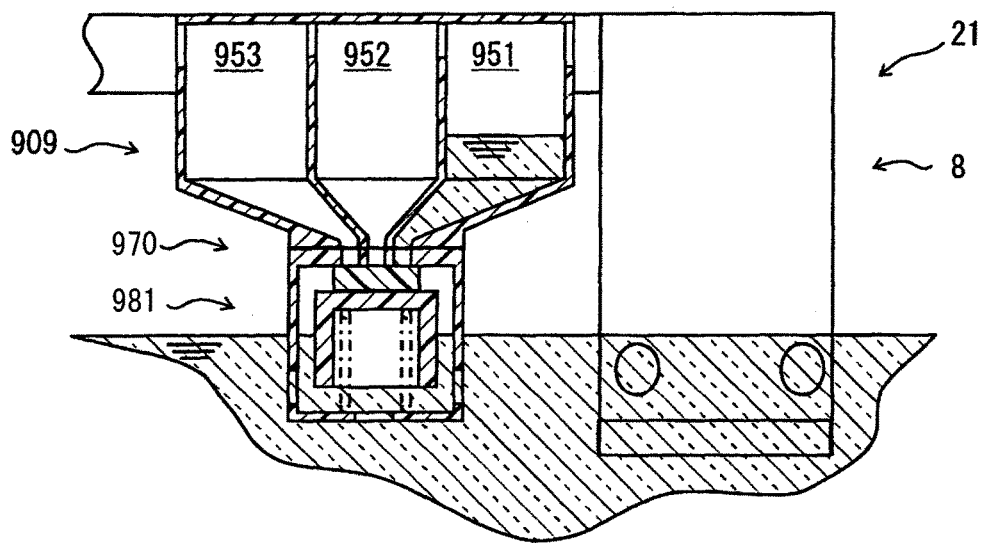
FIG. 19 is a cross sectional view showing a liquid fuel catcher on the vertical plane according to a ninth embodiment of the present disclosure.
Figure 20:
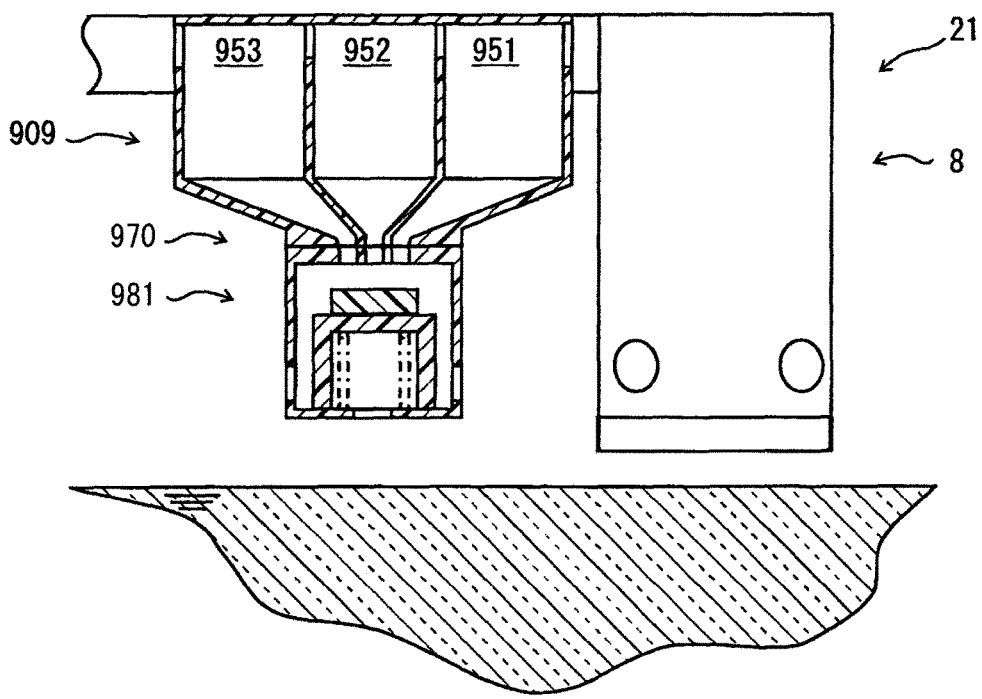
FIG. 20 is a cross sectional view showing the liquid fuel catcher on the horizontal plane according to the ninth embodiment of the present disclosure.

FIG. 19 shows a condition that the float valve 981 is in a closing condition. FIG. 20 shows a condition that the float valve 981 is in an open condition. The liquid fuel catcher 909 defines a plurality of chambers 951-953. These chambers 951-953 are arranged on a lateral side of the ventilation valve 8 in a straight lined arrangement. The liquid fuel catcher 909 has the float valve 981 which opens and closes the return passage 970.

As shown in FIG. 19, a liquid fuel flows from the ventilation valve 8 when the fuel level is high, a liquid fuel will be caught by the chamber 951 and will be accumulated therein. As the fuel level falls, the float valve 981 opens as shown in FIG. 20, and a fuel in the chamber 951 is returned to the fuel tank 3.

Tenth Embodiment

Figure 21:
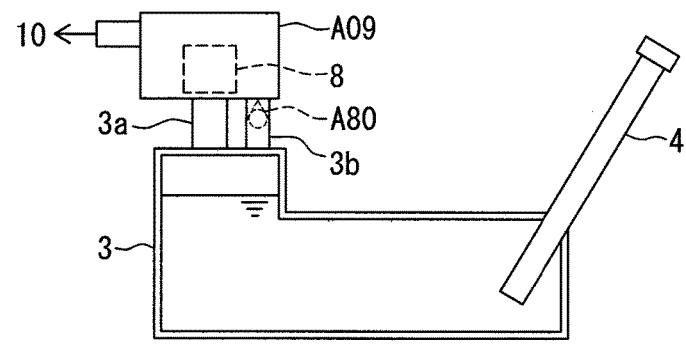
FIG. 21 is a block diagram showing a fuel vapor processing system according to a tenth embodiment of the present disclosure.

This embodiment is one of modifications based on a basic form provided by the preceding embodiment. In the preceding embodiments, the liquid fuel catchers are formed within the fuel tank 3. Alternatively, in this embodiment, as shown in FIG. 21, a liquid fuel catcher A09 is disposed out of a main container portion of the fuel tank 3 in a spaced apart manner from the main container section. Under restricted mounting conditions, such arrangement is advantageous in order to enlarge a volume of the fuel tank 3 as much as possible. Such arrangement improves freedom of choice of mounting locations of the liquid fuel catcher A09.

The liquid fuel catcher A09 is connected and communicated with an upper portion of the fuel tank 3 via a ventilation passage pipe 3a, and a return passage pipe 3b. The ventilation passage pipe 3a and the return passage pipe 3b are provided with pipes made of resin or metal. The ventilation passage pipe 3a provides a part of the ventilation passage. The ventilation passage pipe 3a is connected to the ventilation valve 8. The return passage pipe 3b defines a part of the return passage. The return valve A80 is arranged in the return passage pipe 3b. The ventilation passage pipe 3a and the return passage pipe 3b may be provided by a common pipe between the return valve A80 and the fuel tank 3.

Figure 22:
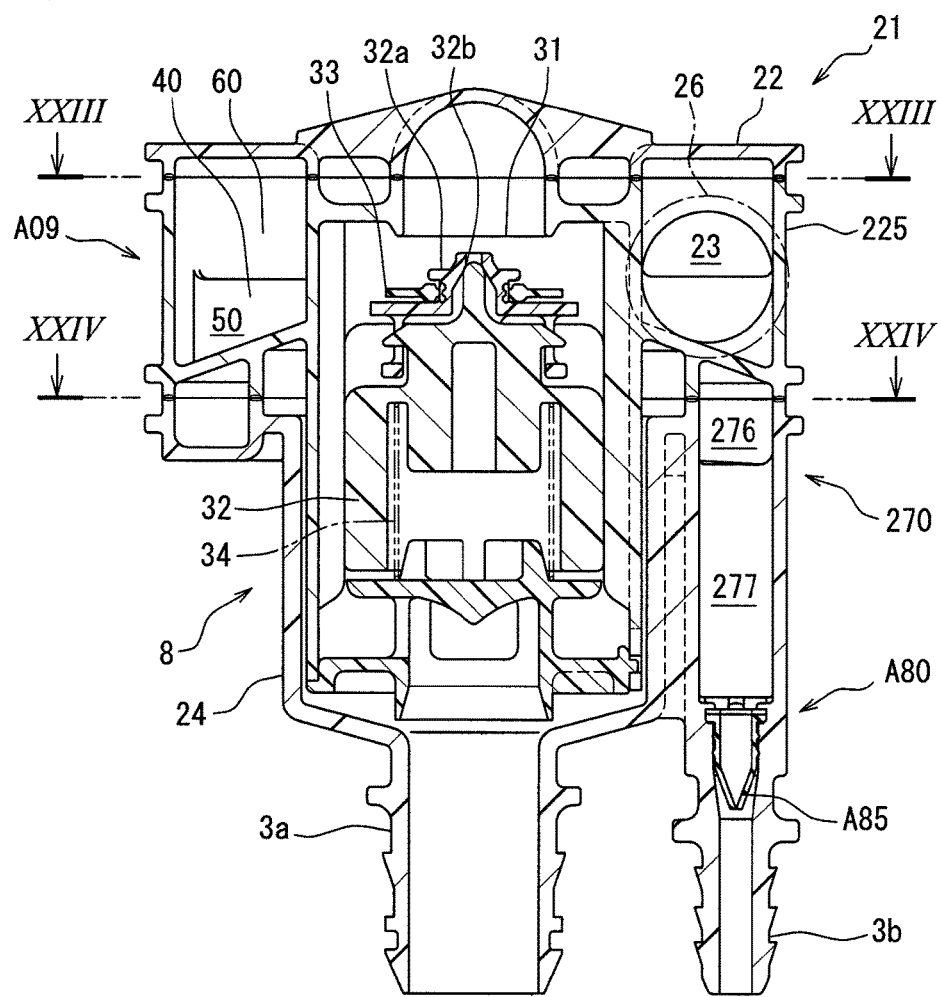
FIG. 22 is a cross sectional view showing the liquid fuel catcher on the vertical plane according to the tenth embodiment of the present disclosure.

As shown in FIG. 22, this embodiment has a configuration and arrangement of a plurality of components both similar to the second embodiment. In this embodiment, the parts assembly 21 also has the ventilation valve 8 and the liquid fuel catcher A09 within the case 22. The vapor passage 23 is arranged on a side of the ventilation valve 8. The vapor passage 23 is arranged to be wound around the outer periphery of the ventilation valve 8. The liquid fuel catcher A09 also has the plurality of barrier walls 40 arranged so that the plurality of chambers 50 are defined within the vapor passage 23. The plurality of barrier walls 40 also provide the plurality of communicating portions 60.

Figure 23:
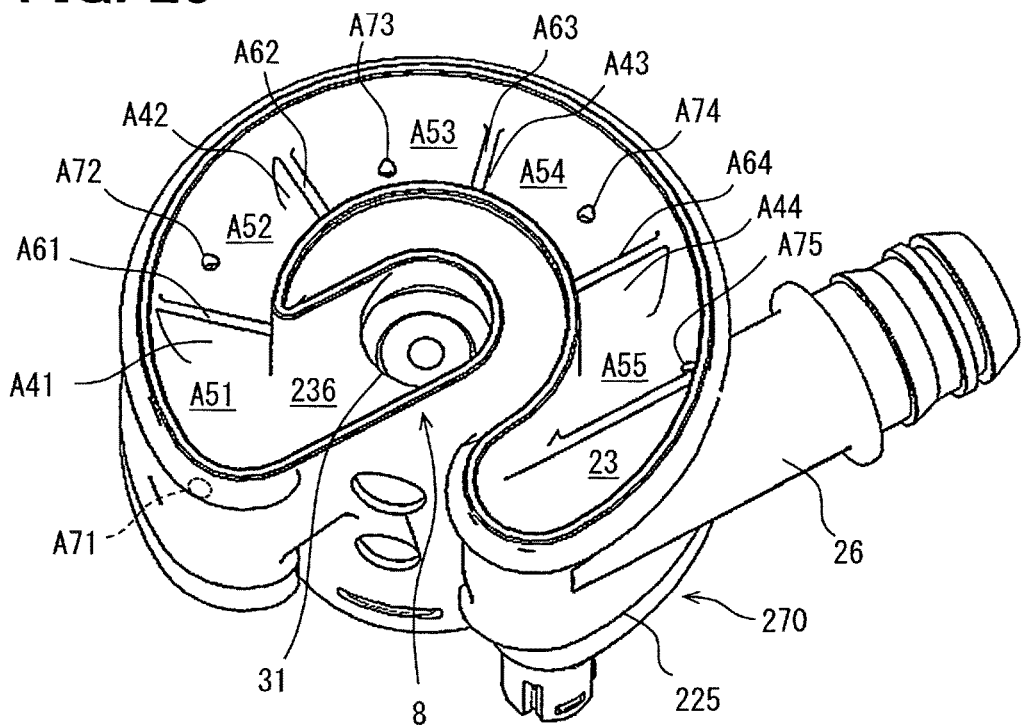
FIG. 23 is a perspective view of a cross section showing a liquid fuel catcher on the horizontal plane along a line XXIII-XXIII in FIG. 22, according to the tenth embodiment.

As shown in FIG. 23, a plurality of chamber A51-A55 are disposed between the inflow passage 236 and the outflow passage 26. A plurality of partitioning walls A41-A44 are disposed on the bottom portion of the vapor passage 23. A plurality of partitioning walls A41-A44 define a plurality of communicating portions A61-A64 above. A plurality of passages A71-A75 open on the lowest part of bottom surfaces of a plurality of chambers A51-A55, respectively. The plurality of passages A71-A75 communicate the plurality of chambers A51-A55 and the collecting chamber 276.

Figure 24:
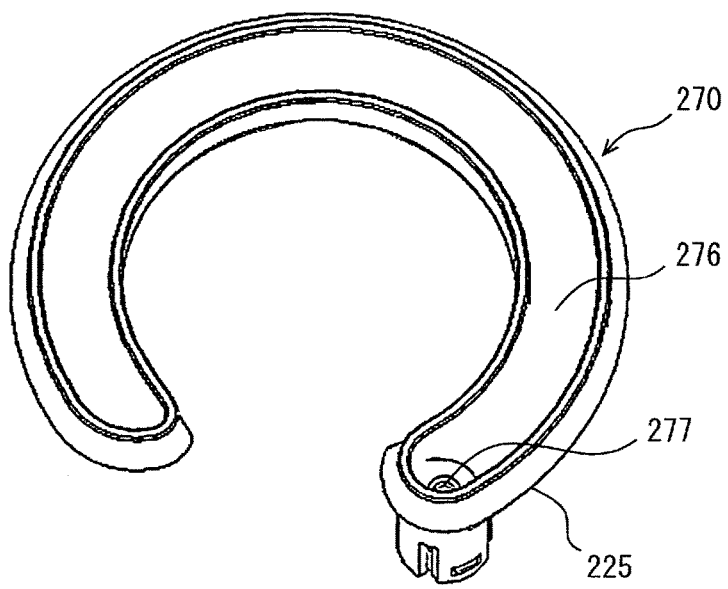
FIG. 24 is a perspective view of a cross section showing a liquid fuel catcher on the horizontal plane along a line XXIV-XXIV in FIG. 22, according to the tenth embodiment.

As shown in FIG. 24, the collecting chamber 276 is defined under a plurality of chambers A51-A55. The common passage 277 opens on the lowest part of the bottom surface of the collecting chamber 276. As shown in FIG. 22, FIG. 23, and FIG. 24, the liquid fuel catcher A09 is formed by joining a plurality of cylindrical case members.

Returning to FIG. 22, the liquid fuel catcher A09 has the collecting chamber 276. The collecting chamber 276 is communicated with the common passage 277. The common passage 277 is extended downwardly from the bottom wall of the collecting chamber 276. A lower end of the common passage 277 is communicated with the return passage pipe 3b. The collecting chamber 276, the common passage 277, and the return passage pipe 3b provide the return passage 270.

The return valve A80 is disposed in the return passage 270. The return valve A80 is a duckbill valve A85. The duckbill valve A85 returns liquid fuel to the fuel tank 3 from the plurality of chambers 50, and prevents reverse flow of fuel from the fuel tank 3 to the plurality of chambers 50. The duckbill valve A85 is disposed so that the return passage 270 is opened and closed. The duckbill valve A85 is a cylindrical member made of rubber or elastic resin. The duckbill valve A85 has an opening that is closed by elasticity of itself. The opening may be formed in a lip shape. For example, the opening may be provided by a slit formed by cutting the cylindrical member. The duckbill valve A85 provides a normally-closed-type check valve. The duckbill valve A85 does not have function like a float which closes the return passage 270 by floating on liquid fuel.

The collecting chamber 276 and the common passage 277 accumulate liquid fuel. Liquid fuel pooled in the collecting chamber 276 and the common passage 277 generates hydraulic head pressure. The collecting chamber 276 and the common passage 277 applies the hydraulic head pressure resulting from liquid fuel to the duckbill valve A85 in a valve opening direction of the duckbill valve A85. The duckbill valve A85 turns to open condition from close condition, if the above-mentioned hydraulic head pressure exceeds at least both a closing pressure caused by elasticity of the duckbill valve A85 itself and a pressure difference acting on the duckbill valve A85 in a valve closing direction. Therefore, the duckbill valve A85 turns to open condition from close condition in response to a weight of the liquid fuel accumulated in chambers, e.g., the chambers 50 and the return passage 270, above the duckbill valve A85.

The ventilation valve 8 works as a float valve and a rollover valve for opening and closing the opening 31. A seal member 33 is attached to and supported on a retainer 32a. The retainer 32a is supported on the float 32 in a manner that the retainer 32a can move slightly in an up and down direction. A pilot valve 32b for decreasing a pressure difference is disposed between the retainer 32a and the float 32.

According to this embodiment, the liquid fuel catcher A09 can be mounted on a place spaced apart from a main container portion of the fuel tank 3. Thereby, it is possible to improve freedom of choice of configurations of the fuel tank 3. It is possible to improve freedom of choice of locations where the liquid fuel catcher A09 can be mounted.

According to this embodiment, a normally-closed-type check valve without float function is provided. The duckbill valve A85 realizes return of the caught fuel and prevention of reverse fuel flow from the fuel tank 3 by employing a low cost and simple configuration.

11th Embodiment

Figure 25:
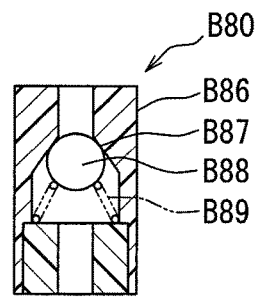
FIG. 25 is a cross sectional view showing a return valve of an eleventh embodiment.

This embodiment is one of modifications based on a basic form provided by the preceding embodiment. In the preceding embodiment, the return valve A80 is provided by the duckbill valve A85. Alternatively, in this embodiment, as shown in FIG. 25, the return valve A80 is provided by a normally-closed-type check valve B86 which has a movable valve member B88. The normally-closed-type check valve B86 provides a normally-closed-type one-way valve.

The normally-closed-type check valve B86 has a body which defines a valve seat B87, and a movable valve member B88 which is movable to open and close the return passage by lifting from and resting on the valve seat B87. The movable valve member B88 is a ball. The movable valve member B88 may be provided by various configurations, such as a mushroom type valve member. The movable valve member B88 receives the weight of the liquid fuel accumulated in the chambers 50 and the return passage 270 in a valve opening direction.

The normally-closed-type check valve B86 has an elastic member B89 which biases the movable valve member B88. The elastic member B89 positions the movable valve member B88 in a valve closing position, when there is no liquid fuel in the chambers 50 and the return passage 270. The elastic member B89 permits that the movable valve member B88 moves in the valve opening direction by the weight of the liquid fuel accumulated in the chambers 50 and the return passage 270. The elastic member B89 is provided by a coil spring. The elastic member B89 can be provided by various members, such as rubber and a plate spring.

According to this embodiment, a normally-closed-type check valve without float function is also provided. The normally-closed-type check valve B86 realizes return of the caught fuel and prevention of reverse fuel flow from the fuel tank 3 by employing a low cost and simple configuration.

12th Embodiment

Figure 26:
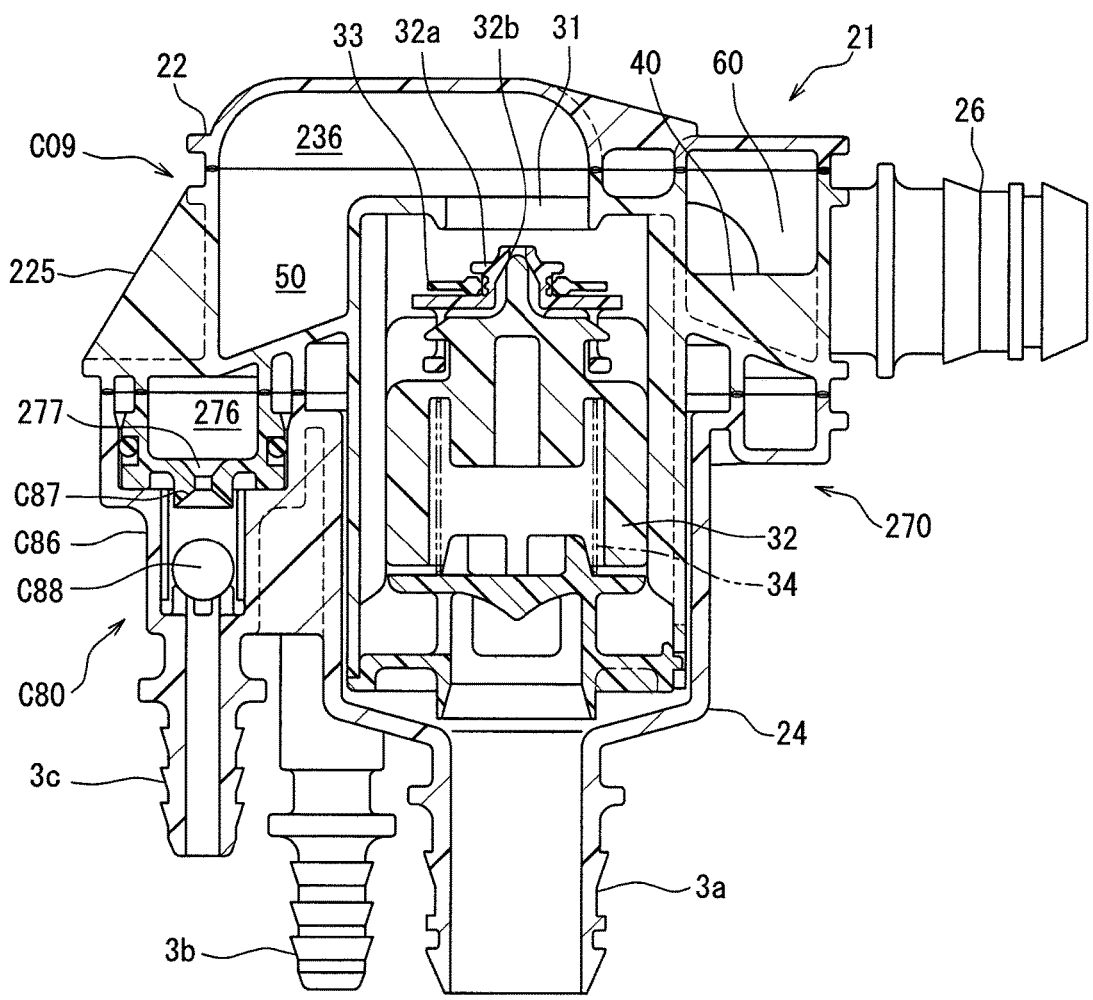
FIG. 26 is a cross sectional view showing a liquid fuel catcher on the vertical plane according to a twelfth embodiment of the present disclosure.

This embodiment is one of modifications based on a basic form provided by the preceding embodiment. In the preceding embodiments, the return valve A80 is provided by the normally-closed-type check valves A85 and B86. Alternatively, in this embodiment, as shown in FIG. 26, the return valve C80 is provided by a normally-open-type check valve C86. The normally-open-type check valve C86 provides a normally-open-type one-way valve.

A liquid fuel catcher C09 has an auxiliary passage pipe 3c which is disposed in parallel with the return passage pipe 3b, and communicates the collecting chamber 276 and the fuel tank 3. The auxiliary passage pipe 3c defines an auxiliary passage. The auxiliary passage provides one of a plurality of passages communicating the fuel tank 3 and the vapor passage 23. The normally-open-type check valve C86 is disposed between the collecting chamber 276 and the auxiliary passage. The normally-open-type check valve C86 has a body which defines a valve seat C87, and a movable valve member C88 which is movable to open and close the return passage by lifting from and resting on the valve seat C87. The body also provides an orifice restricts an amount of ventilation via the auxiliary passage. The movable valve member C88 is a ball. The movable valve member C88 closes the return passage 270 by resting on the valve seat C87 in response to a tilting angle of the liquid fuel catcher C09, i.e., a tilting angle of a vehicle.

The movable valve member C88 opens the return passage 270 when the return valve C80 is in a regular position and closes the return passage 270 when the return valve is not in the regular position. The normally-open-type check valve C86 makes it possible to return liquid fuel to the fuel tank 3, without requiring hydraulic head pressure. The normally-open-type check valve C86 provides a rollover valve. The normally-open-type check valve C86 also provides function for reducing a pressure difference acting on the ventilation valve 8. The collecting chamber 276 is used as a passage for reducing the pressure difference acting on the ventilation valve 8, and also used as a liquid fuel catcher or a liquid fuel trapper for the passage.

In this embodiment, a normally-open-type one-way valve without float function is provided. The normally-open-type check valve C86 realizes return of the caught fuel and prevention of reverse fuel flow from the fuel tank 3 by employing a low cost and simple configuration.

The normally-open-type check valve C86 is connected and communicated to the collecting chamber 276. Therefore, even if liquid fuel breaks through the normally-open-type check valve C86, the collecting chamber 276 provides a barrier against liquid fuel. Liquid fuel which broke through the normally-open-type check valve C86 can be returned to the fuel tank 3 through the duckbill valve B85.

Other Embodiments

The present disclosure is not limited to the above embodiments, and the present disclosure may be practiced in various modified embodiments. The present disclosure is not limited to the above combination, and disclosed technical means can be practiced independently or in various combinations. Each embodiment can have an additional part. The part of each embodiment may be omitted. Part of embodiment may be replaced or combined with the part of the other embodiment. The configurations, functions, and advantages of the above-mentioned embodiments are just examples. The technical scope of disclosure is not limited to the embodiment. Some extent of the disclosure may be shown by the scope of claim, and also includes the changes, which is equal to and within the same range of the scope of claim.

For example, means and functions of the control device 10 may be provided by only software, only hardware or a combination of the software and the hardware. For example, the control device may be made of an analogue circuit.

In the preceding embodiments, the liquid fuel catchers are configured integrally with the ventilation valve 8, and provide the parts assembly 21. Alternatively, the liquid fuel catcher may be integrally formed with the other component belonging to the fuel vapor processing system. The liquid fuel catcher may also be integrally formed with the other component belonging to the fuel tank 3. Furthermore, only the liquid fuel catcher may be provided as an independent component, which can be connected with the other components of the fuel vapor processing system via hoses, etc. For example, the inflow passages 36 and 236 may be provided by hose provided as one of components.

In the preceding embodiment, the liquid fuel catchers are formed within the cases 25, and 225 formed in cylindrical shapes. Alternatively, the liquid fuel catcher may be formed by defining a plurality of chambers in a case which is formed in a cylindrical case, such as a square, or a polygon. In the preceding embodiments, the plurality of chambers are communicated to go around an inside of the case 25 or 225. Alternatively, the communicating portion may be arranged to communicate the plurality of chambers in a zigzag shape. For example, a case may be partitioned in a honeycomb shape to define a plurality of chambers, and the case may be formed to provide a communicating portion in order to communicate the chambers in a series manner.

The liquid fuel catcher 9 of the above-mentioned embodiment has the passages 71-74 independent each other. Alternatively, the passages 71-74 may be communicated just above the return valve 80.

What is claimed is:

1. A liquid fuel catcher, which allows fuel vapor to pass through and catches a liquid fuel, the liquid fuel catcher comprising:
   a case which defines a passage through which fluid containing fuel vapor and the liquid fuel flows, wherein the case defines:
   a plurality of chambers defined as depressions on the passage so that the liquid fuel accumulates;
   a communicating portion which communicates the chambers in series at upper portions of the chambers; and
   a return passage which opens at each of bottom portions of the plurality of chambers and allows the liquid fuel accumulated in the chambers to return to a fuel tank, and wherein the liquid fuel catcher further comprises:
   a return valve which is disposed to open and close the return passage, returns liquid fuel to the fuel tank from the plurality of chambers, and prevents reverse flow of liquid fuel from the fuel tank to the plurality of chambers, wherein
   the plurality of chambers are arranged so that the passage curves,
   the plurality of chambers are arranged circumferentially, and wherein the case has a barrier wall which is disposed between the chambers, and
   the barrier wall is arranged radially with respect to the circumferentially arranged plurality of chambers.

2. The liquid fuel catcher in claim 1, wherein
   the case further defines:
   an inflow passage to a first chamber; and
   an outflow passage from a last chamber, and wherein the inflow passage and the outflow passage extends in different directions on a horizontal plane.

3. The liquid fuel catcher in claim 1, wherein
   the communicating portion is formed on an upper portion of the barrier wall.

4. The liquid fuel catcher in claim 1, wherein
   the case has a bottom portion which defines lower part of the chambers and is inclined to descend toward the return passage.

5. The liquid fuel catcher in claim 1, wherein
   the return passage has a plurality of switchable passages which are opened and closed by the return valve, respectively, and open at the bottom portions of the plurality of chambers, respectively, and are independent from each other to prevent communicating flow of liquid fuel among the plurality of chambers.

6. The liquid fuel catcher in claim 1, wherein
   the return passage comprises:
   a normally open passage which opens at each bottom portion of the plurality of chambers;
   a collecting chamber which is disposed under the plurality of chambers, and is communicated with the plurality of normally open passages commonly; and
   a common passage which opens at a bottom portion of the collecting chamber and is opened and closed by the return valve.

7. The liquid fuel catcher in claim 1, wherein the barrier wall extends from an axis that passes through the return passage, toward an outer circumferential periphery of the liquid fuel catcher, when viewed cross-sectionally along a horizontal plane.

8. The liquid fuel catcher in claim 1, further comprising:
   a ventilation valve which is disposed on the passage between the plurality of chambers and the fuel tank, and opens and closes communication between the fuel tank and the passage, wherein
   the ventilation valve and the plurality of chambers are arranged on a lateral direction in a side by side manner.

9. The liquid fuel catcher in claim 8, wherein
   the ventilation valve is configured to open and close an opening positioned on a predetermined level with respect to a height direction,
   the plurality of chambers are defined to be depressions depressed downwardly with respect to the opening, and
   the return passage is located below the opening.

10. The liquid fuel catcher in claim 9, wherein
    the return valve closes the return passage, when a liquid fuel level in the fuel tank exceeds a predetermined first level, and
    the ventilation valve closes the opening when the liquid fuel level in the fuel tank exceeds a second level higher than the first level.

11. The liquid fuel catcher in claim 10, wherein
    the ventilation valve opens the opening after the return valve opens in response to that the liquid fuel level in the fuel tank is less than the first level.

12. The liquid fuel catcher in claim 9, wherein
    the case is commonly used to arrange the return valve and the ventilation valve integrally as the liquid fuel catcher.

13. The liquid fuel catcher in claim 1, wherein
    the return valve closes the return passage when a liquid fuel level in the fuel tank is higher than a predetermined level, and opens the return passage when a liquid fuel level in the fuel tank is lower than a predetermined level to return the liquid fuel to the fuel tank from the plurality of chambers.

14. The liquid fuel catcher in claim 13, wherein
    the return valve has a float which closes the return passage by floating on liquid fuel.

15. The liquid fuel catcher in claim 1, wherein
    the return valve has a movable valve member which opens a common passage when the return valve is in a regular position and closes the common passage when the return valve is not in the regular position.

16. The liquid fuel catcher in claim 15, wherein
    the return valve is a rollover valve.

17. The liquid fuel catcher in claim 1, wherein
    the return valve turns to an open condition from a closed condition by weight of the liquid fuel accumulated in the chambers and a common passage.

18. The liquid fuel catcher in claim 17, wherein the return valve is a duckbill valve.

19. The liquid fuel catcher in claim 17, wherein the return valve comprises:

a movable valve member which receives the weight of the liquid fuel accumulated in the chambers and the common passage in a valve opening direction; and an elastic member which positions the movable valve member in a valve closing position when there is no liquid fuel in the chambers and the common passage, and permits that the movable valve member moves in the valve opening direction by the weight of the liquid fuel accumulated in the chambers and the common passage.

\* \* \* \* \*